US012642263B2

(12) United States Patent
Li et al.

(10) Patent No.: US 12,642,263 B2
(45) Date of Patent: Jun. 2, 2026

(54) CONTROL SYSTEM AND CONTROL METHOD FOR PEST KILLING BY MICROWAVE AND COMPUTER DEVICE AND STORAGE MEDIUM THEREOF

(71) Applicant: Yangtze Delta Region Institute (Huzhou), University of Electronic Science and Technology of China, Huzhou (CN)

(72) Inventors: Chennan Li, Huzhou (CN); Xianqi Lin, Huzhou (CN); Yang Yu, Huzhou (CN); Yedi Zhou, Huzhou (CN); Zhili He, Huzhou (CN)

(73) Assignee: Yangtze Delta Region Institute (Huzhou), University of Electronic Science and Technology of China, Huzhou (CN)

( * ) Notice: Subject to any disclaimer, the term of this patent is extended or adjusted under 35 U.S.C. 154(b) by 0 days.

(21) Appl. No.: 18/817,076

(22) Filed: Aug. 27, 2024

(65) Prior Publication Data

US 2025/0169488 A1      May 29, 2025

(30) Foreign Application Priority Data

Nov. 23, 2023    (CN) .......................... 202311568668.1

(51) Int. Cl.
A01M 1/22          (2006.01)
A01M 1/20          (2006.01)
(Continued)

(52) U.S. Cl.
CPC .......... *A01M 1/226* (2013.01); *A01M 1/2094* (2013.01); *A23B 7/01* (2013.01); *A24B 3/18* (2013.01)

(58) Field of Classification Search
CPC ....... A01M 1/226; A01M 1/2094; A24B 3/18; A23B 7/01
See application file for complete search history.

(56) References Cited

U.S. PATENT DOCUMENTS 2,064,522 A * 12/1936 Davis .................... A01M 1/223
                                                              43/138
3,478,900 A * 11/1969 Jeppson ................. H05B 6/782
                                                              219/684

(Continued)

FOREIGN PATENT DOCUMENTS

CN          100395498 C  *  6/2008
CN          102520299 A  *  6/2012
(Continued)

OTHER PUBLICATIONS

Luo Deng-Shan et al., "Effects of Microwave Treatment on Tobacco Pest Control and Loosening," Tobacco Science & Technology/ Manufacturing Technology, Jan. 2005, pp. 3-4 and 13, vol. 210, No. 1, China.

(Continued)

*Primary Examiner* — Michael H Wang
(74) *Attorney, Agent, or Firm* — Pilloff Passino & Cosenza LLP; Rachel Pilloff; Sean Passino

(57)          ABSTRACT

Provided herein are a control system and a control method for pest killing by microwave, and a computer device and a storage medium thereof. The control system for pest killing by microwave includes: an inactivation module; an electro-magnetic shielding module; a conveyor belt; and a micro-wave pest killing device, which is a waveguide structure with two open ends and four closed sides. The pest killing method maintains the temperature of the tobacco packages within a specific range, ensuring the quality of the tobacco while effectively inactivating the pests, thereby enhancing the economic efficiency of tobacco factories. The pest killing (Continued)

method employs a reactance counter-current type electromagnetic shielding method, which ensures the smooth operation of the conveyor belt without affecting the health of the operators or the safety of the environment.

10 Claims, 19 Drawing Sheets

(51) Int. Cl.
   *A23B 7/01*      (2006.01)
   *A24B 3/18*      (2006.01)

(56) References Cited

U.S. PATENT DOCUMENTS

| | | | | |
|---|---|---|---|---|
| 3,578,463 | A * | 5/1971 | Smith | A23B 2/08 |
| | | | | 426/241 |
| 3,611,582 | A * | 10/1971 | Hamid | G01N 22/04 |
| | | | | 34/259 |
| 3,699,976 | A * | 10/1972 | Abe | A24B 15/22 |
| | | | | 131/299 |
| 3,820,549 | A * | 6/1974 | Flinchbaugh | A24C 1/383 |
| | | | | 131/299 |
| 4,041,267 | A * | 8/1977 | Wechsler | H02M 5/2573 |
| | | | | 219/718 |
| 4,441,003 | A * | 4/1984 | Eves | A21B 1/48 |
| | | | | 198/570 |
| 4,746,968 | A * | 5/1988 | Wear | F26B 5/048 |
| | | | | 34/259 |
| 6,107,614 | A * | 8/2000 | Linn | F27B 9/029 |
| | | | | 432/244 |
| 6,647,661 | B2 * | 11/2003 | Grigorov | A01M 1/226 |
| | | | | 43/132.1 |
| 8,943,744 | B2 * | 2/2015 | Cohen | H05B 6/707 |
| | | | | 43/132.1 |
| 2004/0025892 | A1 * | 2/2004 | Kreyenberg | A23B 7/01 |
| | | | | 131/299 |
| 2015/0215996 | A1 * | 7/2015 | Yoshida | H05B 6/725 |
| | | | | 219/700 |
| 2015/0313273 | A1 * | 11/2015 | Stromotich | A23B 4/01 |
| | | | | 34/259 |
| 2018/0343713 | A1 * | 11/2018 | Swiergon | B01J 19/126 |
| 2021/0307367 | A1 * | 10/2021 | Van Erp | H05B 6/686 |

FOREIGN PATENT DOCUMENTS

| | | | | |
|---|---|---|---|---|
| CN | 106070140 | A * | 11/2016 | A24B 3/18 |
| FR | 2706252 | A1 * | 12/1994 | A23B 7/01 |

OTHER PUBLICATIONS

Lv Jian-Hua et al., Lethal Effect of Different High Temperature Treatments on Different Development Stages of Lasioderma serricorne (Coleoptera: Anobiidae), Journal of Agricultural Catastrophology, Jan. 2014, pp. 15-17, 20, vol. 4, No. 3, China.

Han Shuncai et al., Effect and Economic Threshold of Microwave in Ephestia elutella (Hubner) Control, Chinese Tobacco Science, Feb. 2023, pp. 57-62, vol. 44, No. 1, China.

\* cited by examiner

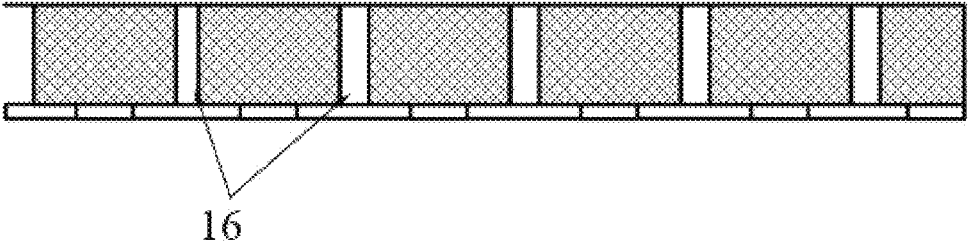
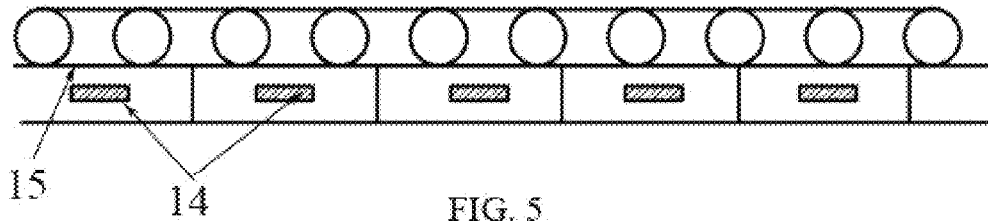
FIG. 5
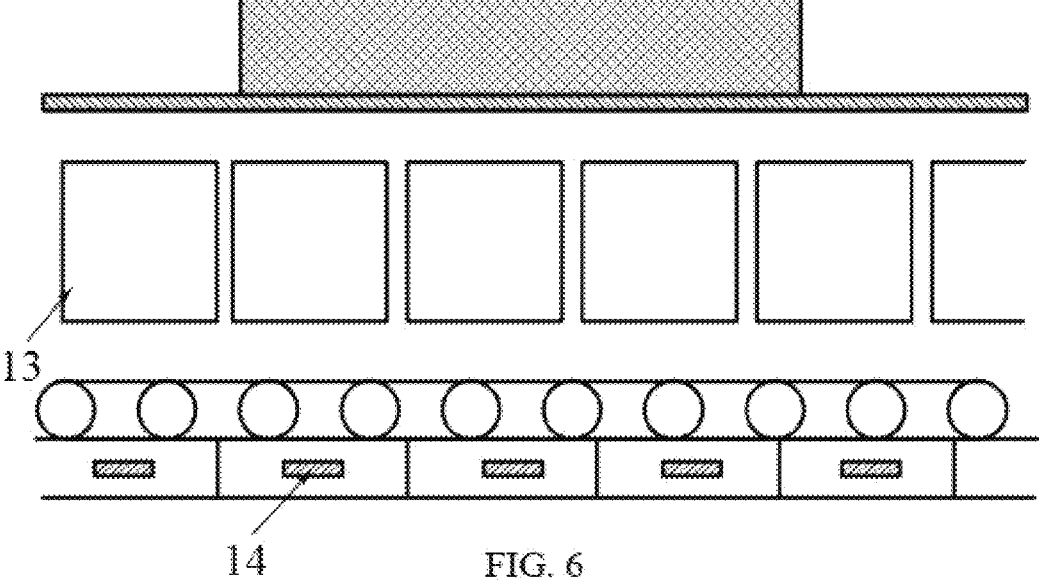
FIG. 6

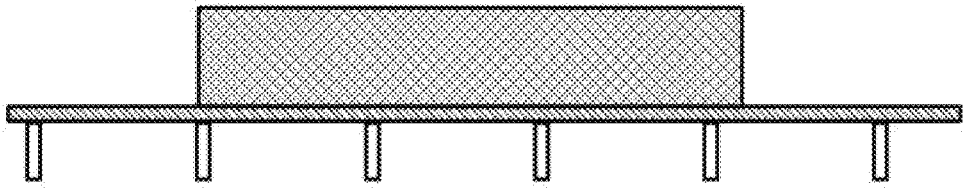
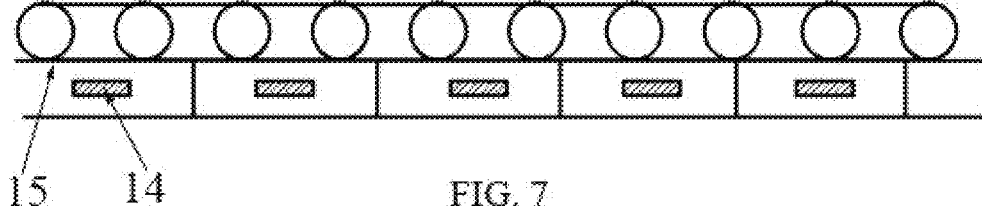
15     14         FIG. 7

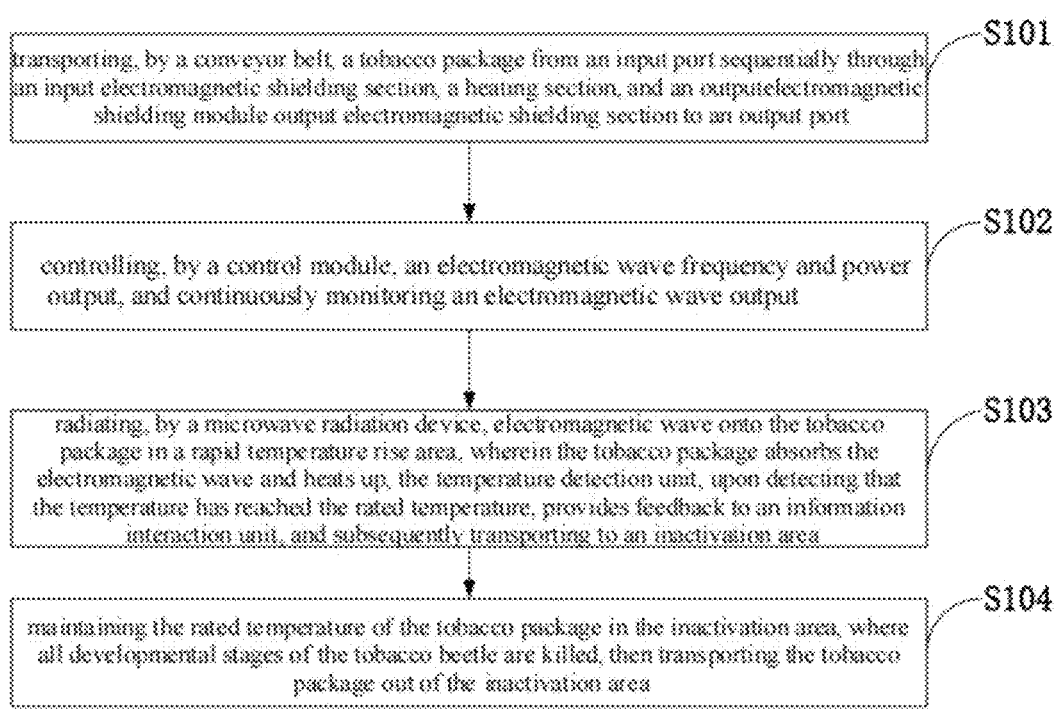

transporting, by a conveyor belt, a tobacco package from an input port sequentially through an input electromagnetic shielding section, a heating section, and an output electromagnetic shielding module output electromagnetic shielding section to an output port ⟶ S101 controlling, by a control module, an electromagnetic wave frequency and power output, and continuously monitoring an electromagnetic wave output ⟶ S102 radiating, by a microwave radiation device, electromagnetic wave onto the tobacco package in a rapid temperature rise area, wherein the tobacco package absorbs the electromagnetic wave and heats up, the temperature detection unit, upon detecting that the temperature has reached the rated temperature, provides feedback to an information interaction unit, and subsequently transporting to an inactivation area ⟶ S103 maintaining the rated temperature of the tobacco package in the inactivation area, where all developmental stages of the tobacco beetle are killed, then transporting the tobacco package out of the inactivation area ⟶ S104

FIG. 8

Experimental Structure Diagram

Antenna

Plastic Bag Containing Tobacco Leaf
Pest Bodies and Eggs

Cavity

Experimental Platform

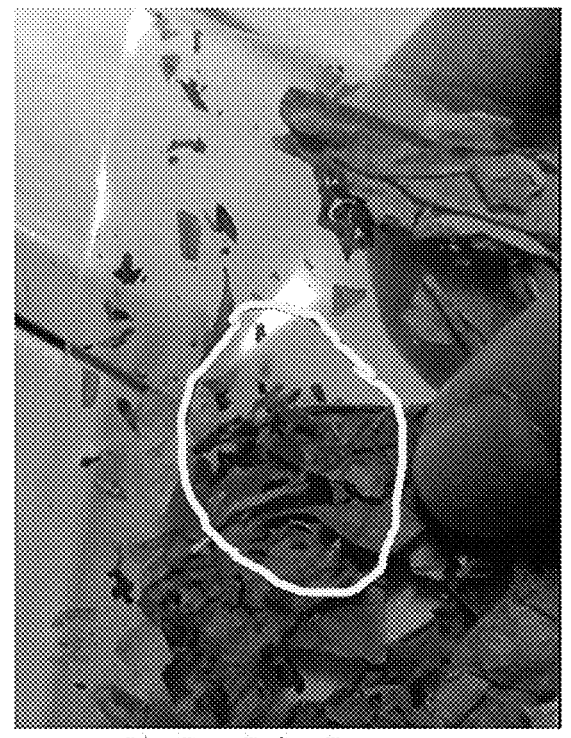
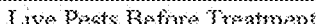
Live Pests Before Treatment
Live Pests After Treatment
FIG. 11

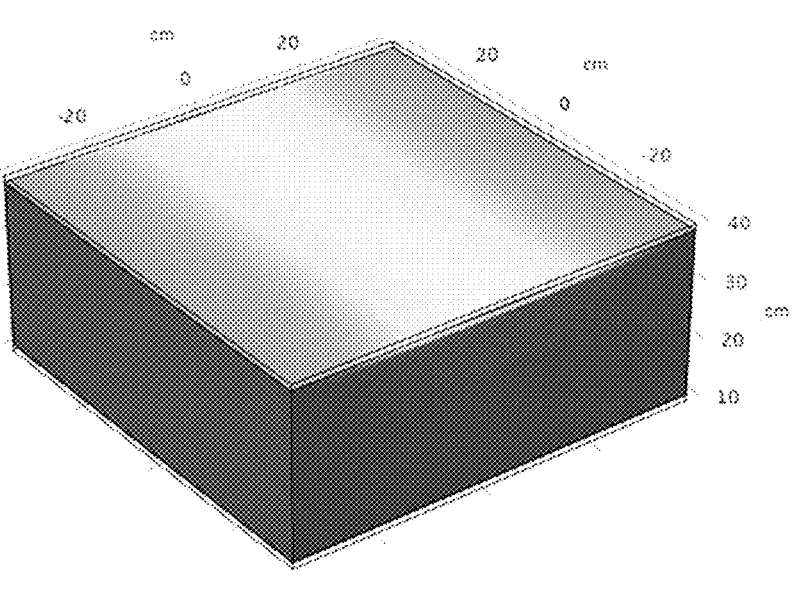
FIG. 13C
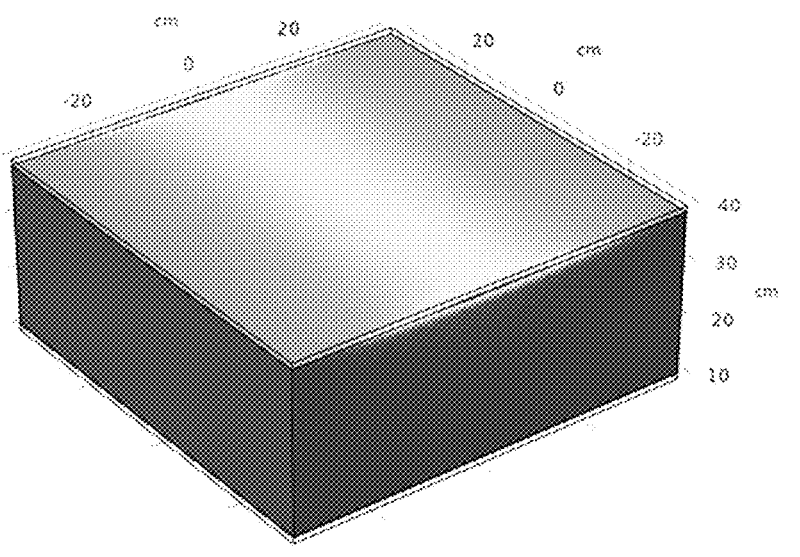
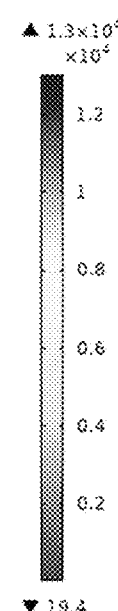
FIG. 13D

CONTROL SYSTEM AND CONTROL METHOD FOR PEST KILLING BY MICROWAVE AND COMPUTER DEVICE AND STORAGE MEDIUM THEREOF

CROSS-REFERENCE TO RELATED APPLICATIONS

This application claims priority under 35 U.S.C. § 119 (a) to Chinese Patent Application No. 2023115686681, filed on Nov. 23, 2023, which is hereby incorporated by reference herein in its entirety.

TECHNICAL FIELD

The disclosure belongs to the field of disinfection technology for tobacco products, and more particularly, relates to a control system and a control method for pest killing by microwave, a computer device and a storage medium thereof.

BACKGROUND ART

Currently, with the modernization of tobacco factory processing technology, consumers and public opinion have started treating tobacco as a special type of food, leading to increased quality demands for tobacco products. Pest contamination is the main reason for the decline in tobacco product quality, with the tobacco beetle being the primary pest responsible for such contamination. Presently, there are three main methods for pest control: 1. Chemical fumigation for pest killing: This method uses chemical fumigants like methyl bromide and phosphine, which are harmful gases. They pose significant risks to operators and the environment, require long operation times, and leave residues that affect normal production work; 2. Ionizing radiation for pest killing: This method commonly employs γ-rays, X-rays, and electron beam radiation. It causes microorganisms to absorb the radiation energy, which destroys their genetic material, leading to metabolic disorders and physical damage of the pests. Moreover, these rays also significantly affect human cells, necessitating dedicated radiation sources, large investments in infrastructure and equipment, and high costs. Additionally, the strict regulations in Europe, the United States, and Japan on the manufacturing and sale of irradiated food products greatly impact the application of this technology and hinder product exports; and 3. Microwave radiation for pest killing: This method uses the thermal effect of microwaves to kill pests. However, current applications typically involve uniform heating throughout the process, which is straightforward but time-consuming, and not conducive to integration with existing tobacco transmission lines. Currently, phosphine fumigation is widely used worldwide for controlling tobacco beetles. However, due to the long-term irrational use of phosphine, pests have developed significant resistance, sometimes leading to fumigation failures. Moreover, the issues of pesticide residue, environmental pollution, and other drawbacks of chemical control have drawn significant global attention. These negative impacts have prompted an urgent search for safer, non-chemical pest control measures.

Existing Technology: Traditional Heat Treatment for Pest Killing

In the field of tobacco production, traditional pest killing methods typically use heat treatment. This involves heating tobacco leaves or tobacco products to a certain temperature to kill pest eggs and microorganisms.

Technical Defects with Existing Technology:

Low energy efficiency: traditional heat treatment technology usually requires long heating times to ensure the interior of the tobacco reaches the necessary temperature, resulting in high energy consumption.

Uneven heating: during the heat treatment process, the exterior of the tobacco is often overheated while the interior does not reach a sufficient temperature, leading to uneven heating and affecting product quality.

Long processing time: due to the limitations of heat conduction, heat treatment requires a long time to bring the entire product to the desired temperature, which impacts production efficiency.

Product quality damage: excessive heating adversely affects the aroma and taste of the tobacco, reducing the quality of the final product.

Environmental safety issues: high-temperature processing poses a risk of combustion, challenging the safety of the operational environment.

SUMMARY

To solve the problems present in existing technologies, the present disclosure provides a control system for pest killing by microwave a control method for pest killing by microwave, and a computer device, and storage medium thereof.

The present disclosure is implemented in the following technical solution. The present application provides a control system for pest killing by microwave, wherein the control system for pest killing by microwave is a waveguide structure with two open ends and four closed sides, applied in a production line of tobacco products, the control system for pest killing by microwave comprising:

an inactivation module for raising and maintaining a temperature of a tobacco package, and for controlling the temperature to not affect a quality of the tobacco package;

an electromagnetic shielding module for preventing electromagnetic energy leakage; and a conveyor belt for transporting the tobacco package.

According to one or more embodiments, the inactivation module comprises:

a rapid temperature rise zone, wherein each area of the rapid temperature rise zone is provided with a temperature sensor, and if a rated temperature is reached in advance, a power of the area is reduced to low power to maintain a current temperature; and an inactivation zone to maintain low microwave power input.

According to one or more embodiments, wherein the electromagnetic shielding module comprises an input electromagnetic shielding section and an output electromagnetic shielding section;

the electromagnetic shielding module consists of a plurality of waveguides of different lengths, with a height of one-quarter of a waveguide wavelength;

a quarter-length waveguide flow isolator is arranged at both ends of the conveyor belt;

the tobacco package is conveyed from an input port, successively passing through the input electromagnetic shielding section, the rapid temperature rise zone, the inactivation zone, and the output electromagnetic shielding section, to an output port;

the rapid temperature rise zone and the inactivation zone include a microwave source, a microwave radiation device, and a control module.

According to one or more embodiments, a metal parallel plate capacitor electrode plate is symmetrically placed on the top, bottom, left, and right of the inactivation module, with the top plate positioned at a top of a cavity and the bottom plate arranged below the conveyor belt, forming a pull-out type structure in the enclosed cavity below the conveyor belt; the metal parallel plate capacitor electrode plates on the top and bottom are connected to the microwave source in a multi-section parallel form.

According to one or more embodiments, a plurality of waveguide ports are arranged directly above the inactivation module, each waveguide port connected to a microwave source to feed the microwave energy into the cavity, with different energy feeding forms for the plurality of waveguide ports; the metal below the conveyor belt is of a mesh structure, with a metal area below the mesh structure arranged as a pull-out type structure.

According to one or more embodiments, a metal parallel plate capacitor electrode plate is symmetrically placed on the top, bottom, left, and right of the inactivation module, with two electrode plates connected to the microwave source, coupling energy into the waveguide formed in the inactivation module through electromagnetic coupling; the metal below the conveyor belt is of a mesh structure, with a metal area below the mesh structure arranged as a pull-out type structure.

According to one or more embodiments, the control module comprises:

a microwave power control unit for controlling a power of the microwave source by adjusting an input voltage to control an amplification factor of the microwave source;

a temperature detection unit, with a temperature sensor that is externally connected to the microwave source to ensure that a circuit temperature of the microwave source does not exceed a certain temperature; a portion of the temperature detection unit is in contact with the outer surface of the tobacco product. Since the outer surface of the tobacco product not only absorbs the energy from microwave heating but also exchanges heat with the surrounding air, the outer surface heats up more rapidly. Therefore, it is crucial to ensure that the temperature of the outer surface does not become excessively high, in order to maintain the overall quality and stability of the tobacco product.

a feedback unit that compares a portion of an output power obtained via a phase shifter and a coupler with the rated output power to calculate a return loss; and a cooling unit that reduces an overall circuit temperature through heat exchange on a circuit surface using airflow.

Another purpose of the present application also provides a control method for pest killing by microwave based on the control system for pest killing by microwave, wherein the control method for pest killing by microwave comprises the following steps:

transporting, by the conveyor belt, the tobacco package from the input port, successively passing through the input electromagnetic shielding section, a heating section, and the output electromagnetic shielding section, to the output port;

controlling, by the control module, an electromagnetic wave frequency and power output, and continuously monitoring an electromagnetic wave output;

radiating, by the microwave radiation device, electromagnetic wave onto the tobacco package in the rapid temperature rise zone, wherein the tobacco package absorbs the electromagnetic wave and heats up, the temperature detection unit, upon detecting that the temperature has reached the rated temperature, provides feedback to an information interaction unit, and subsequently transporting the tobacco package to the inactivation zone; and maintaining the rated temperature of the tobacco package in the inactivation zone, where all developmental stages of the tobacco beetle are killed, then transporting the tobacco package out of the inactivation zone.

Another purpose of the present application also provides a computer device, comprising a memory and a processor, wherein the memory stores a computer program which, when executed by the processor, causes the processor to perform the control method for pest killing by microwave.

Another purpose of the present application also provides computer-readable storage medium, storing a computer program which, when executed by a processor, causes the processor to perform the control method for pest killing by microwave.

Combing the aforementioned technical solutions and the addressed technical issues, the technical solution of this disclosure has the following advantages and positive effects:

Firstly, the tobacco package utilizes a conveyor belt to pass tobacco packages through a microwave pest killing device. Apart from the direction of the conveyor belt movement, all other four directions are metal-shielded to prevent the leakage of electromagnetic waves. Electromagnetic shielding modules are placed at both ends of the direction of conveyor belt movement. The inactivation module consists of a rapid temperature rise zone and an inactivation zone; the rapid temperature rise zone includes a plurality of small heating areas, each heating independently, while the heating process in the inactivation zone is unified. The electromagnetic shielding module is designed with three segments of quarter-wavelength short waveguides, achieving electromagnetic shielding in the direction of the conveyor belt movement. Metal parallel plate capacitor electrode plates (metal parallel plate capacitor electrodes) are symmetrically placed above and below the inactivation module, with the upper plates at the top of the cavity and the lower plates below the conveyor belt, forming a closed cavity beneath the conveyor belt with a pull-out structure for easy cleaning of tobacco residues and maintenance. The upper and lower metal parallel plate capacitor electrode plates are connected to the microwave source in a plurality of parallel segments to reduce manufacturing and installation costs.

A plurality of waveguide ports are arranged directly above the inactivation module, each connected to a microwave source, feeding energy into the cavity. The energy feeding methods of the plurality of waveguide ports vary, thus achieving uniform heating effects. The metal underneath the conveyor belt is of a mesh structure for collecting scattered tobacco leaves, with a pull-out structure below the mesh for easy cleaning and maintenance.

Metal parallel plate capacitor electrode plates are symmetrically placed on the top, bottom, left, and right of the inactivation module, with two electrode plates connected to the microwave source, coupling energy into the waveguide formed in the inactivation module through electromagnetic coupling, allowing the energy to propagate within the waveguide and heat the tobacco packages inside. The metal area below the conveyor belt is of a mesh structure for collecting fallen tobacco leaves, and the metal area beneath the mesh structure is arranged as a pull-out structure for easy cleaning of tobacco residues and maintenance.

Secondly, this disclosure heats the tobacco products rapidly with microwaves and maintains a stable temperature, continuously inactivating tobacco pests through the biological effects of microwave heating and preventing the re-hatching of eggs. For the safety and stability of the entire process, electromagnetic shielding modules are installed on both sides of the system; a temperature detection unit ensures the stability of the tobacco product quality; a feedback unit ensures the safety and stability of the microwave source; and a cooling unit maintains the stability and safety of the system's temperature.

The pest killing method used in this disclosure does not require production to be halted for the pest control process to be carried out. It is efficient and convenient, uses low-cost microwave sources, and has low infrastructure and equipment costs, making it suitable for widespread adoption. It maintains the temperature of the tobacco package within a specific range, does not affect the quality of the tobacco in the package, and simultaneously inactivates the tobacco pests, enhancing the economic benefits for the tobacco factory. The pest killing method employs a reactance counter-current type electromagnetic shielding approach, ensuring the smooth operation of the conveyor belt without affecting the health of the operators or the environmental safety.

Thirdly, the expected returns and commercial value of this technical solution after conversion are: The system, when using a microwave power of 10.2 Kw with an operating time of 100 seconds, is capable of processing 10 kg of tobacco products per cycle. Based on local electricity costs, the cost is calculated at 0.016 RMB/kg; assuming a worker work 8 hours per day, 600 kg of tobacco leaves can be processed daily, with a labor cost of 120 RMB, resulting in a labor cost of 0.2 RMB/kg.; the cost of a microwave prototype is 60,000 RMB, with the national regulation of a microwave equipment lifespan of 10 years, thus the daily machine depreciation and operation cost is 133.3 RMB, resulting in a machine depreciation and operation of 0.22 RMB/kg. Therefore, the total pest control cost is 0.436 RMB/kg. The average economic loss rate caused by a single larva is 0.40%; with the average price of tobacco leaves being 37 RMB/kg, the economic threshold for microwave control of tobacco moths is calculated to be 2.95/kg. That is, when the density of tobacco moth larvae in 1 kg of tobacco leaves exceeds 2.95, microwave eradication is economically valuable.

The technical solution of this disclosure fills a technical gap both domestically and internationally: This disclosure fills the gap in the domestic use of microwave technology for continuous tobacco product production and transportation without stopping for pest inactivation. It addresses the diverse issues of processing and transportation machinery in tobacco factories across various provinces, achieving uniform inactivation of internal and external tobacco pests without altering the quality of the tobacco products, and suppressing the hatching of eggs through the biological effects of microwaves.

This disclosure solves a technical problem that people have long wanted to solve but have not yet succeeded in solving. This disclosure resolves the integration of production and pest inactivation in tobacco factories, enabling continuous production while inactivating pests within tobacco products, maintaining the quality of the tobacco products effectively. The entire inactivation process is safe and stable, does not produce harmful substances, and is environmentally friendly. This disclosure overcomes the public's prejudice against uneven microwave heating. Through an antenna-like design, it achieves a uniform distribution of electric fields inside and outside the tobacco products, resulting in a uniform temperature field across the products.

Fourthly, the control system for pest killing by microwave provided by this disclosure, designed specifically for tobacco product production lines, uses microwave technology for pest killing, bringing the following significant technological advances:

1. Efficient Inactivation Effect

Precise Temperature Control: Through microwave sources in the rapid temperature rise zone and inactivation zone, the system quickly heats the tobacco package to the required temperature and accurately maintains it. This rapid and precise temperature control not only enhances pest killing efficiency but also ensures that the quality of the tobacco products is not affected by heat treatment.

2. Enhanced Electromagnetic Safety

Effective Electromagnetic Shielding: The electromagnetic shielding modules, including input and output shielding, ensure the effective use of microwave energy and prevent its leakage into the external environment, thus enhancing the system's safety and environmental compliance.

3. Increased Production Efficiency

Continuous Production Line Processing: The conveyor belt design within the system allows tobacco packages to continuously pass through the microwave treatment area, suiting the high-efficiency requirements of production lines. This design significantly boosts production efficiency and reduces the need for manual intervention.

4. Energy Conservation and Environmental Protection

Energy Saving: The microwave pest killing method is more energy-efficient than traditional thermal or chemical treatments, reducing energy consumption. Additionally, as it does not use chemical pesticides, the system is more environmentally friendly.

5. Automation and Intelligent Control

Smart Control System: The microwave radiation device and control module in the inactivation module enable the entire system to automatically adjust power and processing time based on actual conditions, further enhancing the treatment effect and energy use efficiency.

The control system for pest killing by microwave provided by this disclosure has made significant technological advancements in enhancing the safety, efficiency, and environmental friendliness of tobacco production lines, while reducing operational complexity and production costs through automated and intelligent design.

BRIEF DESCRIPTION OF THE DRAWINGS

FIG. 5 is a schematic diagram of the microwave radiation device of Scheme 2 according to one or more embodiments of the present disclosure.

FIG. 6 is a schematic diagram of the microwave radiation device of Scheme 1 placed horizontally according to one or more embodiments of the present disclosure.

FIG. 7 is a schematic diagram of the microwave radiation device of Scheme 3 placed either vertically or horizontally according to one or more embodiments of the present disclosure.

FIG. 8 is a flowchart of the microwave pest killing method according to one or more embodiments of the present disclosure.

FIG. 11 is a diagram showing live pests before and after treatment according to one or more embodiments of the present disclosure.

FIGS. 13A-13D are diagrams showing the penetration of electromagnetic waves at 2.45 GHz and 915 MHz simulated by the software COMSOL according to one or more embodiments of the present disclosure.

DETAILED DESCRIPTION

Figure 1:
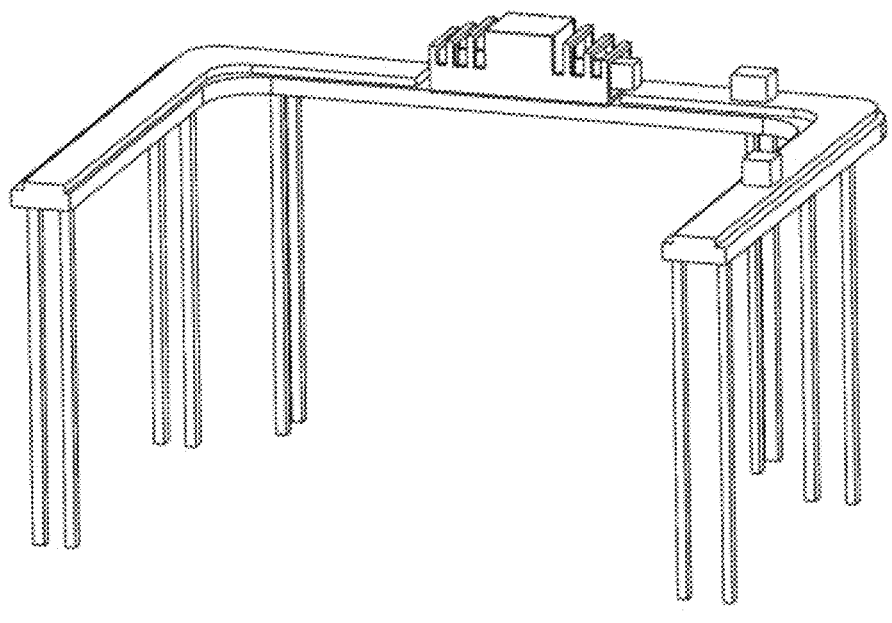
FIG. 1 is a schematic diagram of the structure of the control system for pest killing by microwave according to one or more embodiments of the present disclosure.

In order to make the purpose, technical solution, and advantages of the present disclosure clearer, the following detailed description of the disclosure is provided in conjunction with specific embodiments. It should be understood that the specific embodiments described herein are merely used to explain the disclosure and are not intended to limit it.

Based on the control system for pest killing by microwave provided by the disclosure, the following are two specific embodiments and their implementation schemes:

Embodiment 1: Application in Large-Scale Tobacco Processing Plants

Application Scenario: In large tobacco processing plants, high efficiency and high-quality pest killing treatment are required to ensure continuous operation of the production line and product quality.

1. High-Capacity Conveying System: Design a high-capacity conveyor belt system capable of handling large volumes of tobacco packages to meet the demands of large-scale production.

2. High-Power Microwave Sources: Install multiple high-power microwave sources in the rapid heating area zone and the inactivation zone to ensure fast and uniform heating treatment.

3. Efficient Electromagnetic Shielding: Enhance the design of the electromagnetic shielding module to prevent electromagnetic radiation leakage during high-power operation.

4. Automated Control System: Implement a fully automated control system to monitor and adjust microwave power, conveyor belt speed, and tobacco package temperature in real-time, ensuring efficient and consistent processing quality.

Embodiment 2: Application in Small-Scale Tobacco Craft Manufacturing

Application Scenario: For small-scale tobacco craft manufacturers who need more flexible and economical pest killing treatment solutions.

1. Compact Design: Design a compact control system for pest killing by microwave suitable for limited workspace environments, capable of handling smaller batches of tobacco products.

2. Adjustable Microwave Power: Provide adjustable microwave power settings to meet the processing needs of different sizes and types of tobacco products.

3. Simplified Electromagnetic Shielding: Implement a simplified yet effective electromagnetic shielding design to reduce costs while ensuring safety.

4. Semi-Automatic Control Interface: Design a user-friendly semi-automatic control interface, allowing operators to manually adjust parameters according to different production needs.

The present disclosure provides two embodiments demonstrating how the control system for pest killing by microwave can be adjusted and optimized according to different application scenarios and production scales, thereby offering more flexible and efficient pest killing solutions. As shown in FIGS. 1-7, the control system for pest killing by microwave provided by the embodiments of the present disclosure includes: an inactivation module 1 for raising and maintaining the temperature of tobacco packages and for controlling the temperature to ensure it does not affect the quality of the tobacco packages; an electromagnetic shielding module 2 for preventing electromagnetic energy leakage; a conveyor belt 3 for transporting tobacco packages 4; and a microwave pest killing device, which is a waveguide structure with open ends and enclosed sides, applied on the tobacco product production line.

The inactivation module 1 includes: a rapid temperature rise zone 11, which adjusts the temperature rise speed by changing the power based on the size of the conveyor belt 3 and the device operation time, ensuring that all parts of the tobacco package 4 reach the rated temperature uniformly upon entering the inactivation zone. Each area of the rapid temperature rise zone 11 is provided with a temperature sensor; if the rated temperature is reached early, the power in that area is reduced to low power to maintain the current temperature. The inactivation zone 12 maintains a low microwave power input to keep the tobacco package 4 at the rated temperature, avoiding an increase temperature that would otherwise affect the quality of the tobacco package while ensuring effective pest control. The higher the temperature of the tobacco pack, the higher the pest control efficiency, but if the temperature exceeds 65° C., the quality of the tobacco leaves will deteriorate, so it needs to be maintained at a certain temperature.

The electromagnetic shielding module 2 includes an input electromagnetic shielding section 21 and an output electromagnetic shielding section 22; the electromagnetic shielding module is composed of waveguides of varying lengths, each with a height of one quarter of the waveguide wavelength. To prevent microwaves from affecting the health of operators, metal shielding is required in all directions except the conveyor belt's movement direction to avoid electromagnetic wave leakage. The surface of the shield curtain in the direction of the conveyor belt's movement is metalized to prevent microwave leakage. To further analyze the risk of electromagnetic leakage, once metal shielding is applied, the area of the conveyor belt becomes a metallic waveguide. When the electromagnetic wave's wavelength is more than twice the longest side of the waveguide, all modes in the waveguide cease. At a frequency of 433 MHz, the wavelength of the electromagnetic wave is 69 cm, and typically, the gaps in the equipment are much smaller than the electromagnetic wave's wavelength. Thus, ensuring that the conveyor belt area has no gaps wider than 10 cm with the outside world eliminates the risk of electromagnetic leakage. For added security, quarter-length short-waveguide reactance devices (flow isolator) can be arranged at both ends of the conveyor belt to ensure no electromagnetic wave leakage.

The tobacco packages 4 are transported by the conveyor belt 3 from the input port, sequentially passing through the input electromagnetic shielding section 21, the rapid temperature rise zone 11, the inactivation zone 12, and the output electromagnetic shielding section 22, to the output port.

Both the rapid temperature rise zone 11 and the inactivation zone 12 include a microwave source, a microwave radiation device, and a control module. There are three schemes for the microwave radiation device:

Metal parallel plate capacitor electrodes 13 are symmetrically placed on the top and bottom of the inactivation module, with the upper part positioned at the top of the cavity and the lower part arranged below the conveyor belt. The area beneath the conveyor belt forms a pull-out enclosed cavity 14, facilitating the cleaning of tobacco residues and maintenance. The upper and lower metal parallel plate capacitor electrodes 13 are connected to the microwave source in multiple parallel segments, reducing processing and installation costs.

Multiple waveguide ports 16 are set directly above the inactivation module, with each waveguide port connected to a microwave source, feeding microwave energy into the cavity. The different energy feed forms from multiple waveguide ports 16 achieve uniform heating. The metal area below the conveyor belt is of a mesh structure 15 for collecting fallen tobacco leaves, and the metal area beneath the mesh structure 15 is arranged as a pull-out structure 14 for easy cleaning of tobacco residues and maintenance.

Metal parallel plate capacitor electrode plates are symmetrically placed on the top, bottom, left, and right of the inactivation module, with two electrode plates connected to the microwave source, coupling energy into the waveguide formed in the inactivation module through electromagnetic coupling, allowing the energy to propagate within the waveguide and heat the tobacco packages inside. The metal area below the conveyor belt is of a mesh structure 15 for collecting fallen tobacco leaves, and the metal area beneath the mesh structure 15 is arranged as a pull-out structure 14 for easy cleaning of tobacco residues and maintenance.

The microwave sources and microwave radiation devices operate at a same frequency.

The control module includes: a microwave power control unit for controlling a power of the microwave source by adjusting an input voltage to control an amplification factor of the microwave source; a temperature detection unit, with a temperature sensor that is externally connected to the microwave source to ensure that a circuit temperature of the microwave source does not exceed a certain temperature; a feedback unit that compares a portion of an output power obtained via a phase shifter and coupler with the rated output power to calculate a return loss; and a cooling unit that reduces an overall circuit temperature through heat exchange on a circuit surface using airflow.

The technical principle of this disclosure is as follows: Pest bodies contain a large number of polar molecules such as water molecules and triglycerides. When subjected to an external alternating electromagnetic field, these polar molecules within the pest bodies reorient in response to the changing electromagnetic field. The rapid and frequent friction among these numerous polar molecules converts electromagnetic energy into thermal energy. This, in turn, raises the temperature of the pest body, disrupting cell membrane functions, causing cell dehydration, and coagulating proteins, thereby achieving pest killing. When the microwave treatment temperature exceeds the rated temperature, the pest killing (including egg extermination) efficiency can reach 100% [Luo Dengshan, Xiao Chunju, Xi Niansheng, et al. Study On Effects of Microwave Treatment on Tobacco Pest Control and Loosening [J]. Tobacco Science and Technology, 2005 (1): 3-4 and 13]. Research indicates that microwave equipment alone can completely eradicate the tobacco moth [Han Shuncai, Chen Tao, Gu Gang, et al. Effect and Economic Threshold of Microwave in Ephestia elutella Control. Chinese Tobacco Science, 2023, 44(1): 57-62.].

FIG. 1 is an overall schematic diagram of the microwave pest killing device in this disclosure. Tobacco packages are transported by the conveyor belt through the microwave pest killing device for pest extermination. All directions except for the conveyor belt movement direction are metal-shielded to prevent electromagnetic wave leakage. Both ends of the conveyor belt movement direction are equipped with electromagnetic shielding modules.

Figure 2:
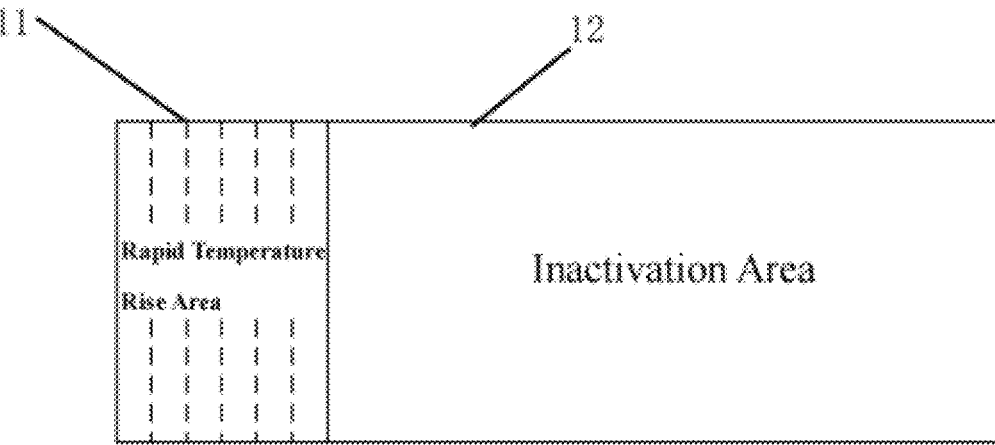
FIG. 2 is a schematic diagram of the distribution of the inactivation module according to one or more embodiments of the present disclosure.

FIG. 2 is a schematic diagram showing the distribution of the inactivation module in this disclosure, mainly composed of the rapid temperature rise area and the inactivation zone. The rapid temperature rise zone consists of multiple small heating areas, each heating independently. The inactivation zone heats uniformly.

Figure 3:
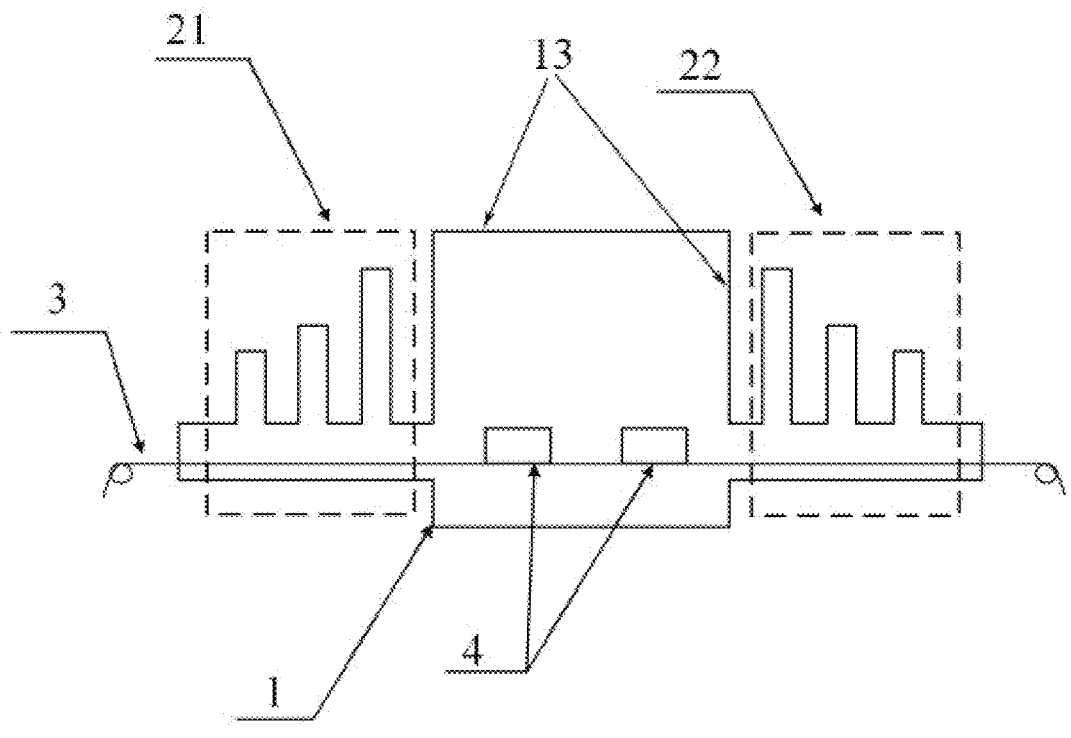
FIG. 3 is a schematic diagram of the electromagnetic shielding module according to one or more embodiments of the present disclosure.

FIG. 3 is a schematic diagram of the electromagnetic shielding module in this disclosure. It achieves electromagnetic shielding in the conveyor belt movement direction through the design of three quarter-wavelength short waveguides.

Figure 4:
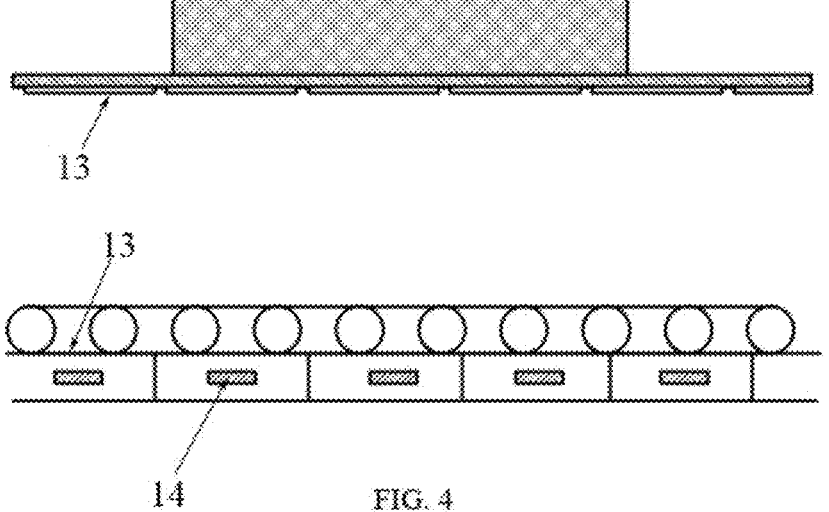
FIG. 4 is a schematic diagram of the microwave radiation device of Scheme 1 placed vertically according to one or more embodiments of the present disclosure.

FIG. 4 is a schematic diagram of the first scheme of the microwave radiation device in this disclosure, showing the top and bottom placements. Metal parallel plate capacitor electrodes 13 are symmetrically placed on the top and bottom of the inactivation module, with the upper part positioned at the top of the cavity and the lower part arranged below the conveyor belt. The area beneath the conveyor belt forms a pull-out enclosed cavity 14, facilitating the cleaning of tobacco residues and maintenance. The upper and lower metal parallel plate capacitor electrodes 13 are connected to the microwave source in multiple parallel segments, reducing processing and installation costs.

FIG. 5 is a schematic diagram of the second scheme of the microwave radiation device in this disclosure. Multiple waveguide ports 16 are set directly above the inactivation module, each connected to a microwave source to feed microwave energy into the cavity. The different energy feed forms from multiple waveguide ports 16 achieve uniform heating. The metal area below the conveyor belt is of a mesh structure 15 for collecting fallen tobacco leaves, and the metal area beneath the mesh structure 15 is arranged as a pull-out structure 14 for easy cleaning of tobacco residues and maintenance.

FIG. 6 is a schematic diagram of the first scheme of the microwave radiation device in this disclosure, showing the left and right placements. Metal parallel plate capacitor electrodes 13 are symmetrically placed on the left and right sides of the inactivation module.

FIG. 7 is a schematic diagram of the third scheme of the microwave radiation device in this disclosure, showing the top and bottom or left and right placements. Metal parallel plate capacitor electrode plates are symmetrically placed on the top, bottom, left, and right of the inactivation module, with two electrode plates connected to the microwave source, coupling energy into the waveguide formed in the inactivation module through electromagnetic coupling, allowing the energy to propagate within the waveguide and heat the tobacco packages inside. The metal area below the conveyor belt is of a mesh structure 15 for collecting fallen tobacco leaves, and the metal area beneath the mesh structure 15 is arranged as a pull-out structure 14 for easy cleaning of tobacco residues and maintenance.

As shown in FIG. 8, the control method for pest killing by microwave provided by the embodiments of this disclosure includes the following steps:

S101: The conveyor belt transports the tobacco packages sequentially from the input end through the input electromagnetic shielding section, heating section, and output electromagnetic shielding section to the output port.

S102: The control module controls the frequency and power output of the electromagnetic waves and monitors the electromagnetic wave output in real-time.

S103: In the rapid temperature rise zone, electromagnetic waves are radiated onto the tobacco packages by the microwave radiation device, causing the tobacco packages to absorb the waves and increase in temperature. The temperature detection unit detects when the temperature reaches the rated value and feeds this information back to the information interaction unit, then transports the packages to the inactivation zone.

S104: In the inactivation zone, the temperature of the tobacco packages is maintained at the rated value, killing all life stages of the tobacco beetle, and the tobacco packages are then transported out of the inactivation zone.

II. Application Examples

To demonstrate the inventiveness and technical value of the technical solutions provided by this disclosure, this section provides application examples of the technical solutions claimed, as applied to specific products or related technologies.

Depending on the equipment and the placement of tobacco products in different tobacco factories:

1. If the vertical height of the equipment is similar to that of the tobacco products, we can use the top and bottom placement of microwave radiation device of the scheme 1. The more fully the gaps between the devices are filled, the better the heating effect.

2. If the horizontal width of the equipment is similar to that of the tobacco products, we can use the left and right placement of microwave radiation device of the scheme 1.

3. If the height of the tobacco products varies, we can use microwave radiation device of the scheme 2. The energy distribution in the scheme 2 is not affected by the height of the tobacco products, thereby achieving a uniform and stable inactivation process.

4. If the tobacco products are not continuous, we can use microwave radiation device of the scheme 3. This scheme guides microwave energy through the electrodes, focusing the energy on the position of the tobacco products, preventing echo damage to the microwave source.

Currently, this disclosure can be applied to large tobacco packages of 1136 mm*720 mm*725 mm, sliced tobacco packages of 725 mm*720 mm*284 mm, and loose tobacco slices. By adjusting the frequency for different tobacco package formats, a uniform inactivation effect can be achieved.

III. Evidence of Related Effects of the Implementation

The embodiments of this disclosure have achieved some positive effects during research and use, showing significant advantages over existing technologies. The following content describes these effects using experimental data, charts, and other evidence.

Figure 9:
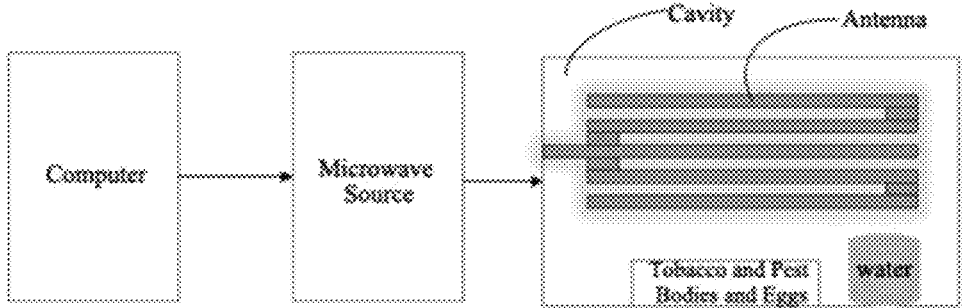
FIG. 9 is a block diagram of the experimental structure according to one or more embodiments of the present disclosure.
Figure 10:
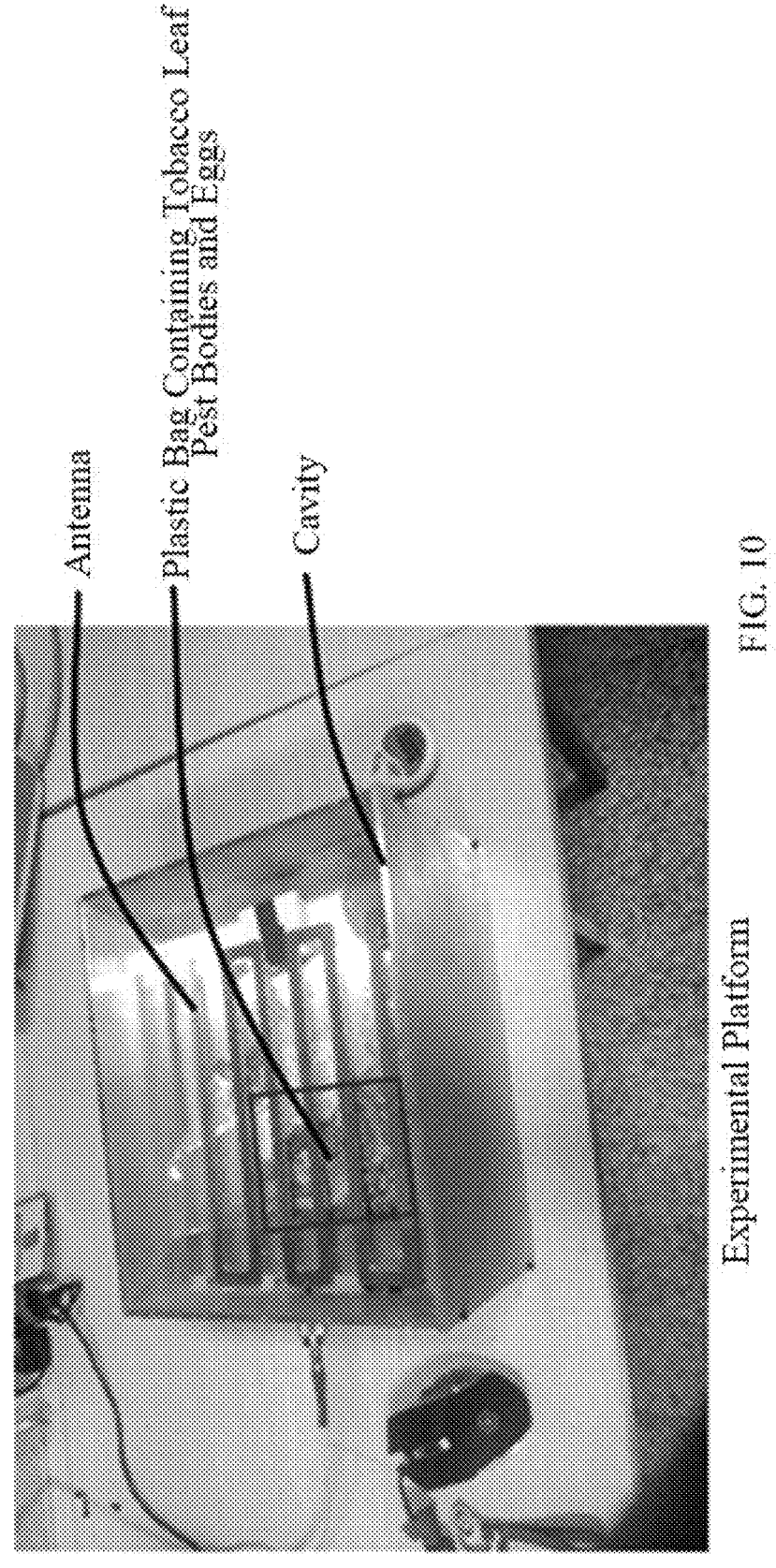
FIG. 10 is a diagram of the experimental platform according to one or more embodiments of the present disclosure.

1. Feasibility Study of Microwave Pest Control Scheme
   Verification experiments are shown in FIGS. 9-10.
   As shown in FIG. 11, after microwave heating treatment, all live pests were killed.

2. Feasibility Study of Microwave Pest Control Antenna Scheme
   Principle of Microwave Pest Control: Microwave heating has characteristics such as strong penetration, low thermal inertia, high selectivity, and fast speed. After being irradiated by microwaves, the pests (including eggs) in the tobacco leaves experience disrupted cell membrane functions, cell dehydration, and protein coagulation, thereby achieving pest control. When the microwave treatment temperature exceeds 60° C., the effectiveness of killing larvae (eggs) can reach 99% [Luo Dengshan, Xiao Chunju, Xi Niansheng, et al. Study On Effects of Microwave Treatment on Tobacco Pest Control and Loosening [J]. Tobacco Science and Technology, 2005 (1): 3-4 and 13].

Figure 12:
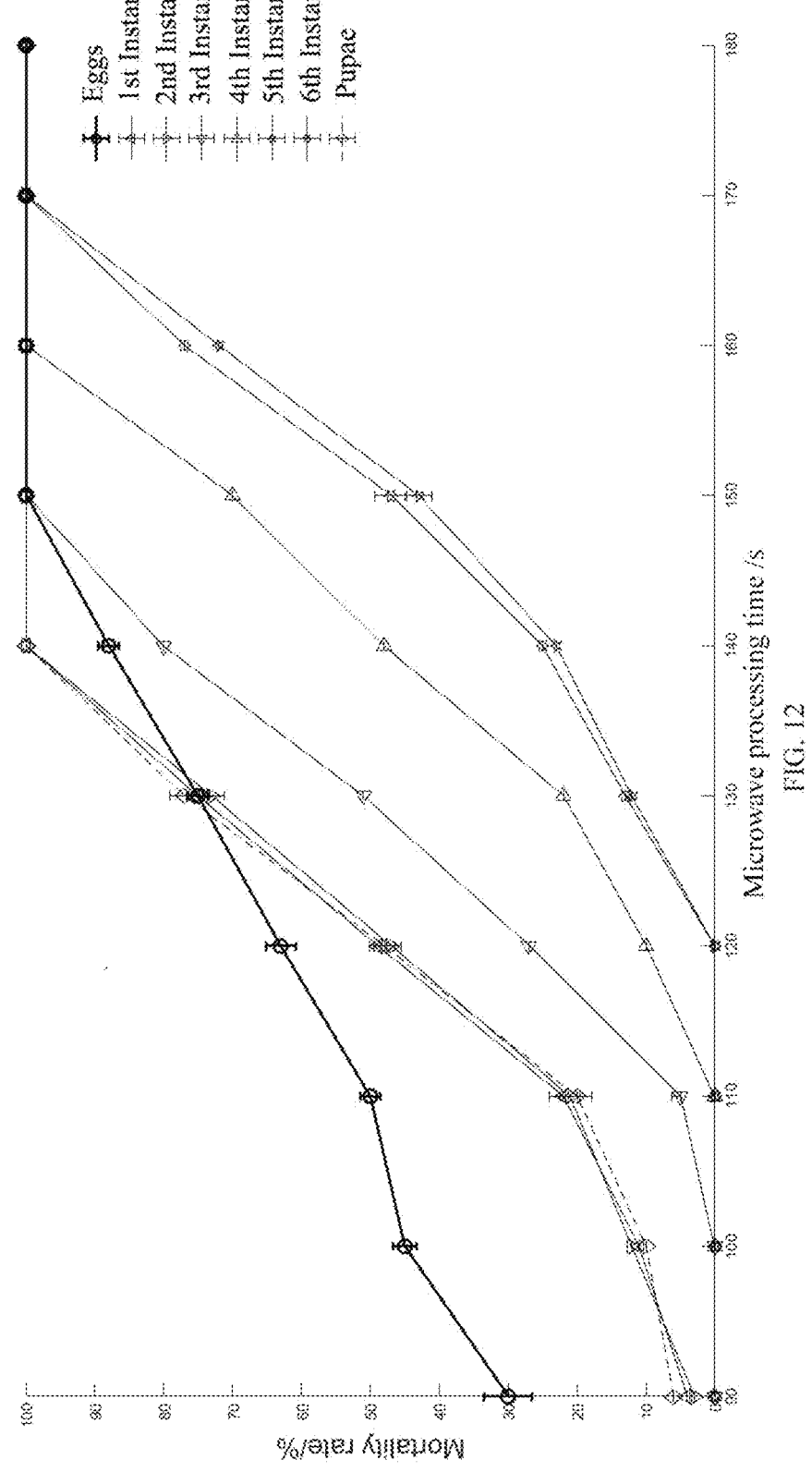
FIG. 12 is a diagram showing the relationship between microwave treatment time and mortality rate according to one or more embodiments of the present disclosure.
Figure 13A:
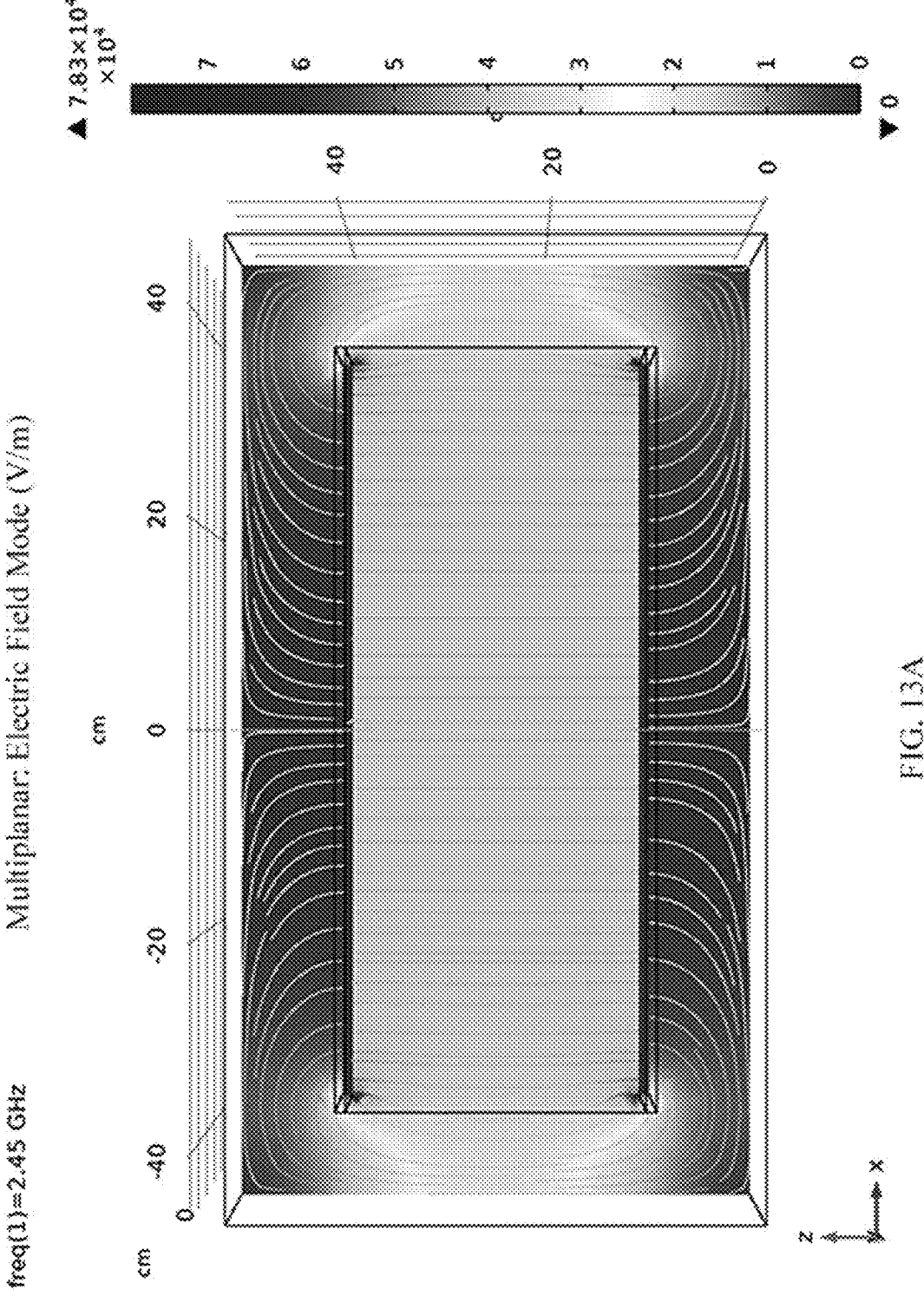
Figure 13B:
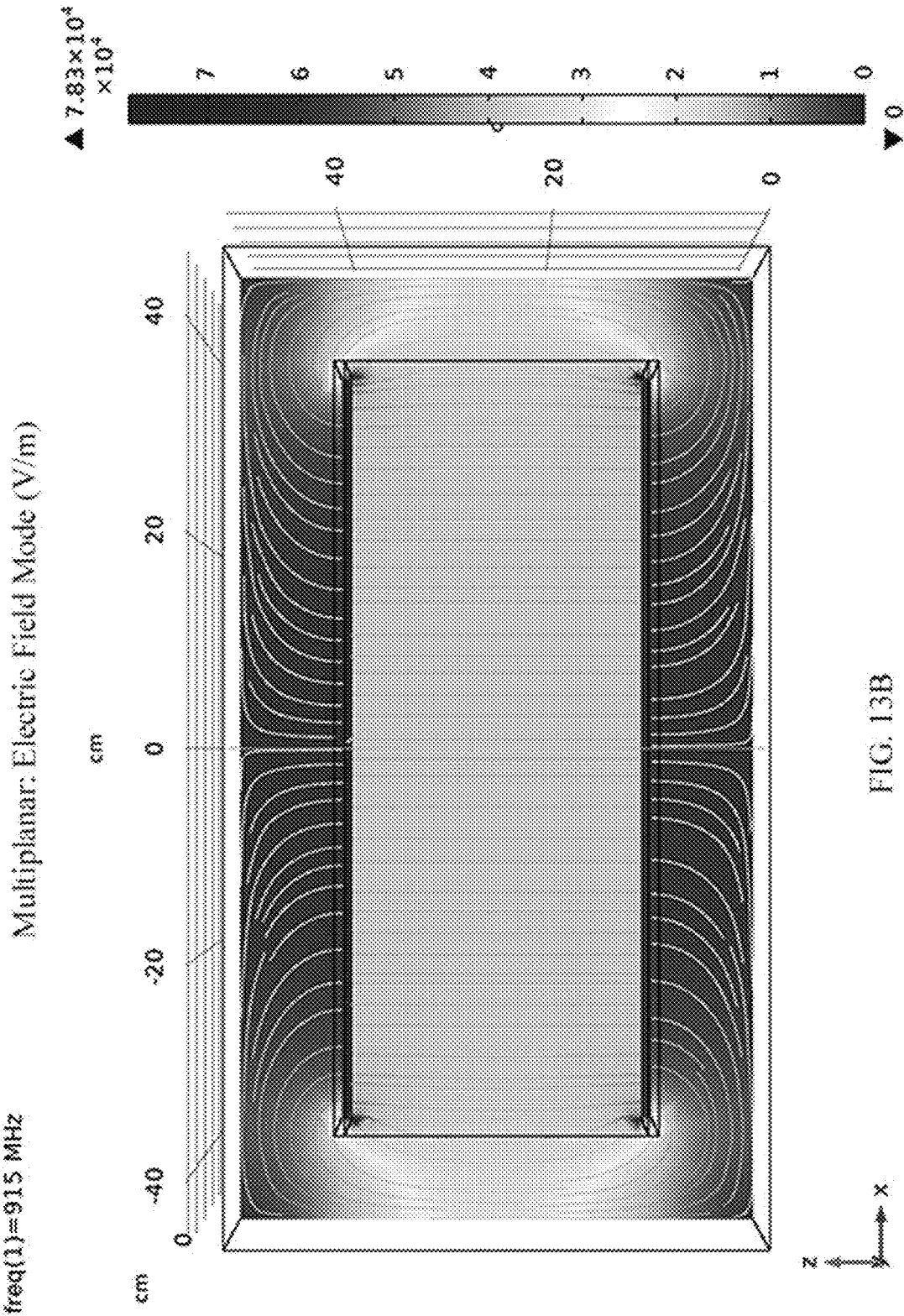

As shown in FIG. 12, related research papers indicate that microwave equipment alone can completely eradicate the tobacco moth [Han Shuncai, Chen Tao, Gu Gang, et al. Effect and Economic Threshold of Microwave in Ephestia elutella Control. Chinese Tobacco Science, 2023, 44(1): 57-62.].

Antenna Types: Parallel plate capacitor+waveguide
Skin Depth Formula:

$$D_P = \frac{\lambda(\varepsilon')^{1/2}}{2\pi\varepsilon''_{eff}}$$

Thus, the penetration depth of electromagnetic waves in the tobacco package is related to the frequency, dielectric constant of the tobacco, and the loss tangent. The higher the frequency, the poorer the penetration ability of the electromagnetic waves.

Through COMSOL software simulation, the penetration of electromagnetic waves at 2.45 GHz and 915 MHz was analyzed, as shown in FIGS. 13A-13D. Both frequencies were unable to penetrate the tobacco pack. According to the formula and industrial ISM frequencies, the lowest usable frequency is 433 MHz.

Figure 14:
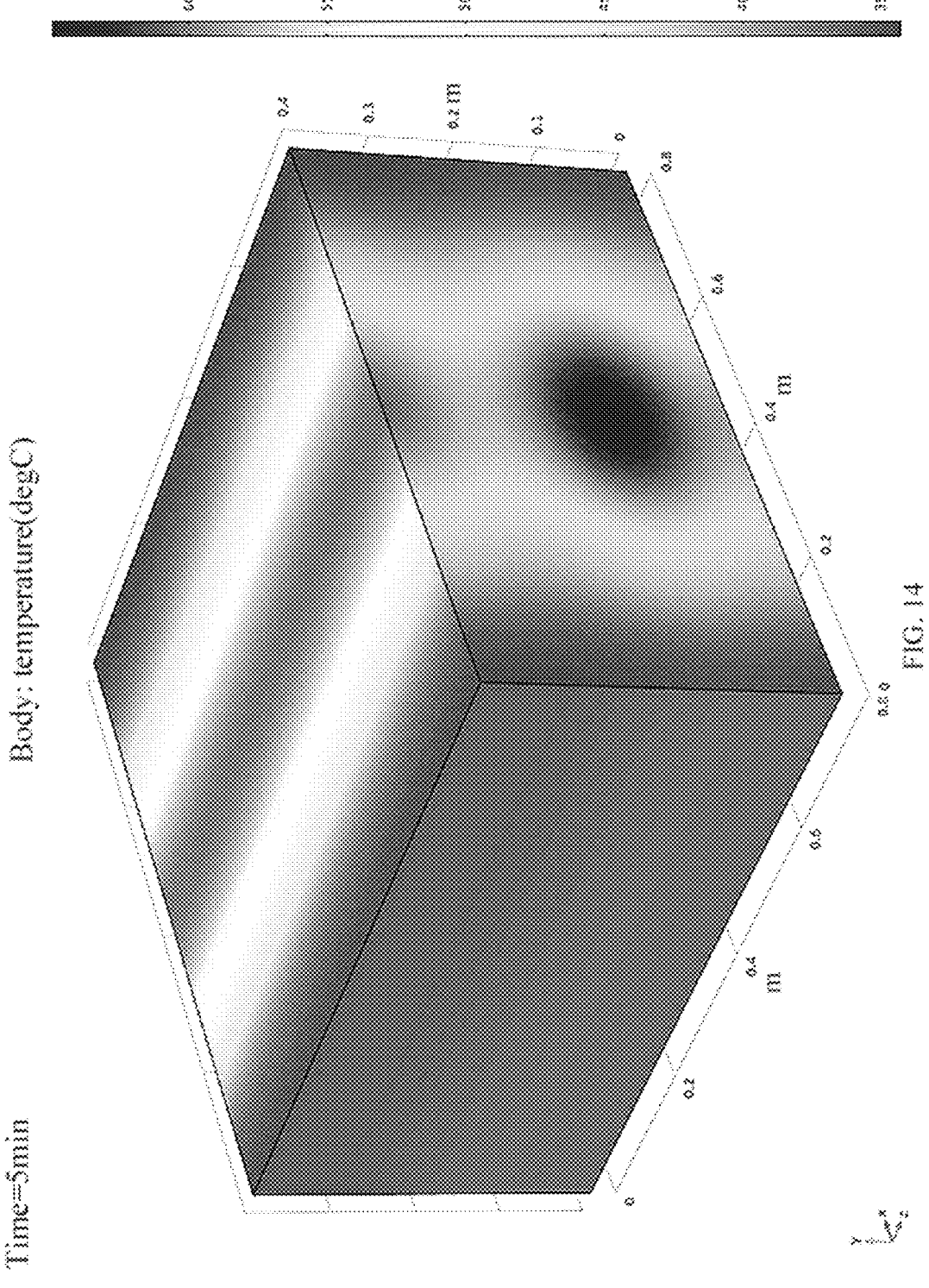
FIG. 14 is a diagram showing the heating effect at 433 MHz simulated by COMSOL according to one or more embodiments of the present disclosure.

The heating effect of 433 MHz was simulated using COMSOL, as shown in FIG. 14.

For small tobacco blocks, at a power of 500 W for a duration of 30 seconds and a frequency of 433 MHz, the entire tobacco package was heated without exceeding the specified maximum temperature. However, the heating uniformity was still insufficient. Future plans include changing the antenna form, and due to the tobacco packages moving on the conveyor belt in actual processes, the heating uniformity is expected to improve further.

Figure 15:
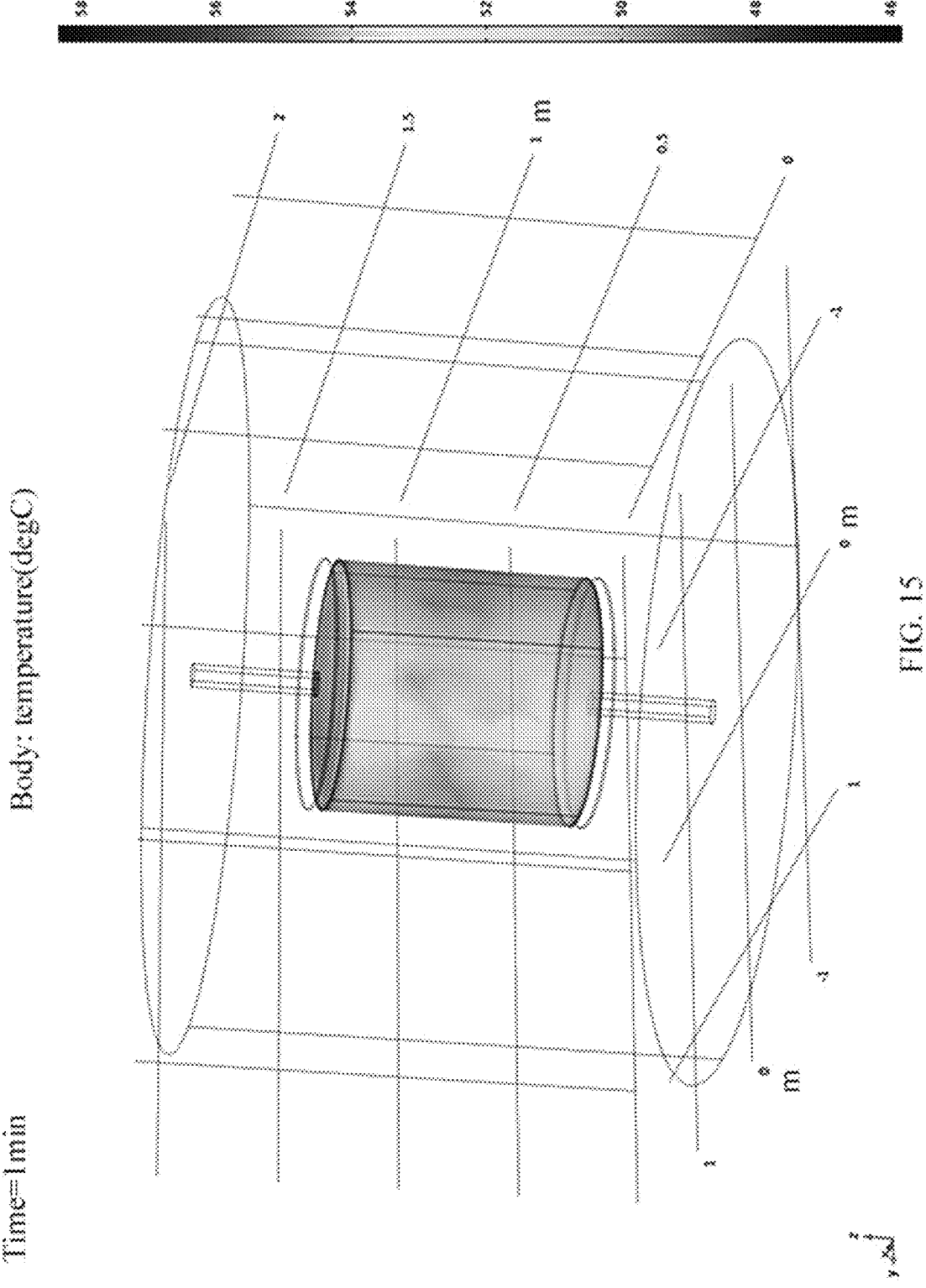
FIG. 15 is a diagram showing that the transformation from waveguide feeding to parallel plate form results in a more uniform electric field distribution, further improving the uniformity of heating according to one or more embodiments of the present disclosure.
Figure 16A:
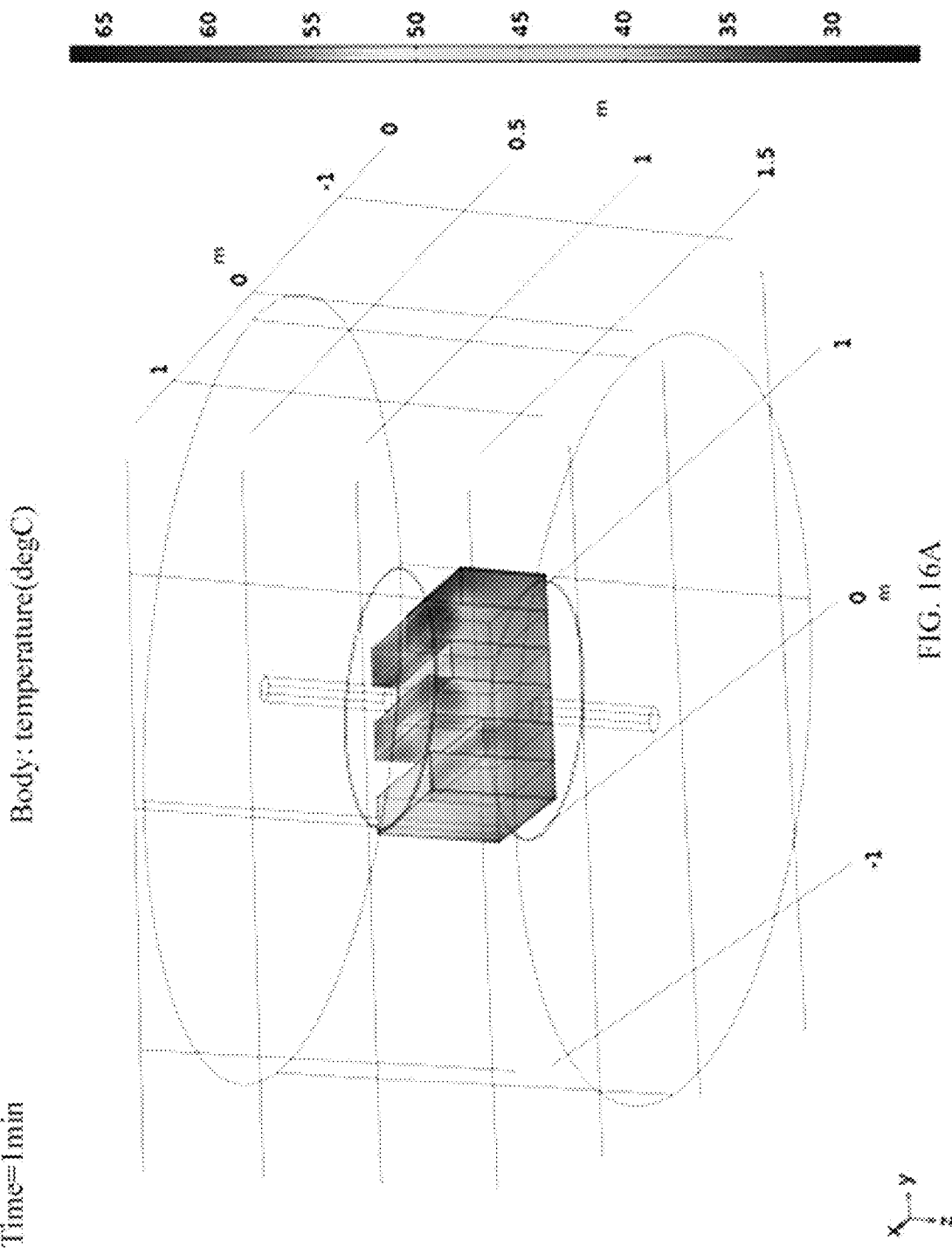
FIGS. 16A-16D are diagrams showing the temperature distribution of tobacco packages from 1 minute to 5 minutes according to one or more embodiments of the present disclosure.
Figure 16B:
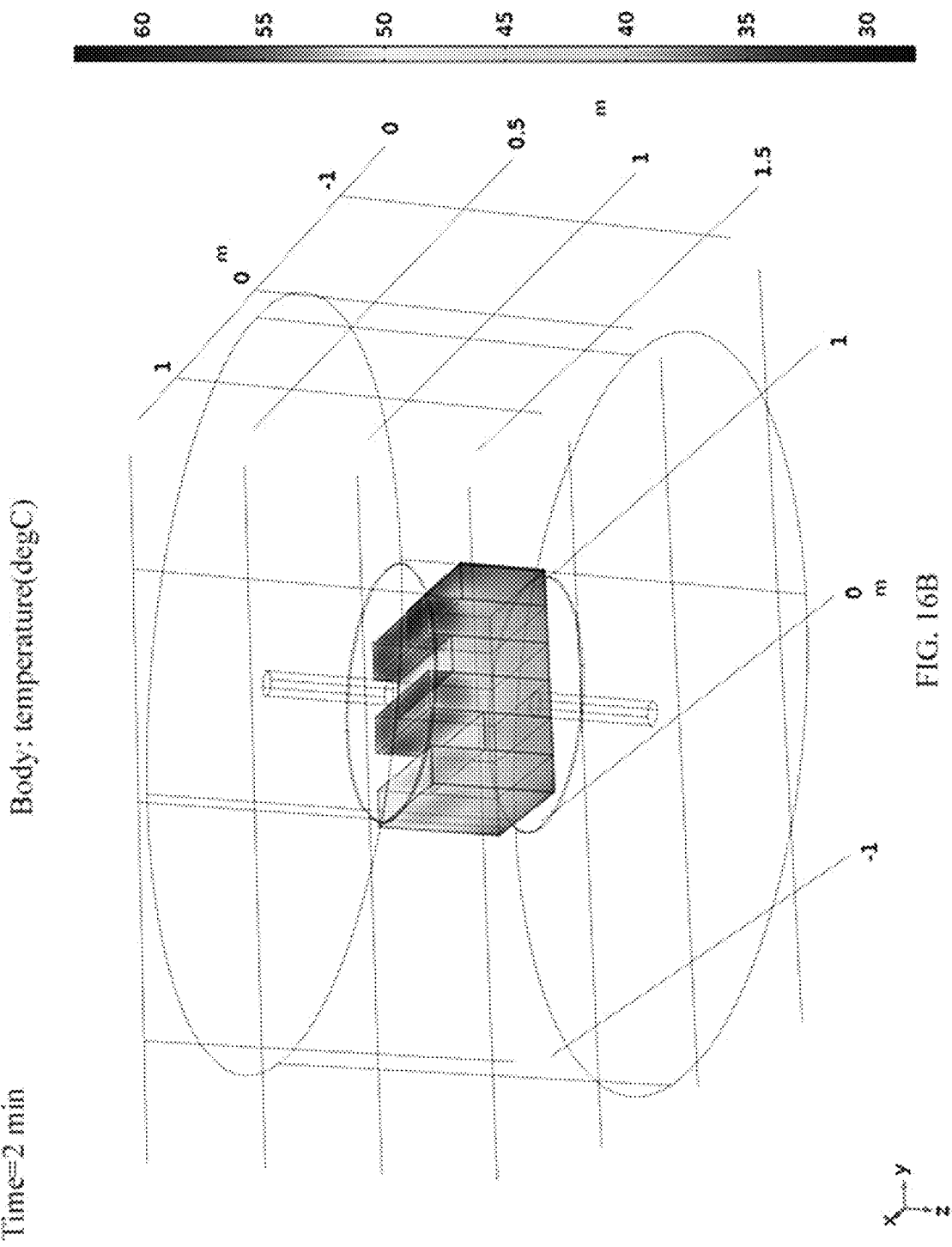
Figure 16C:
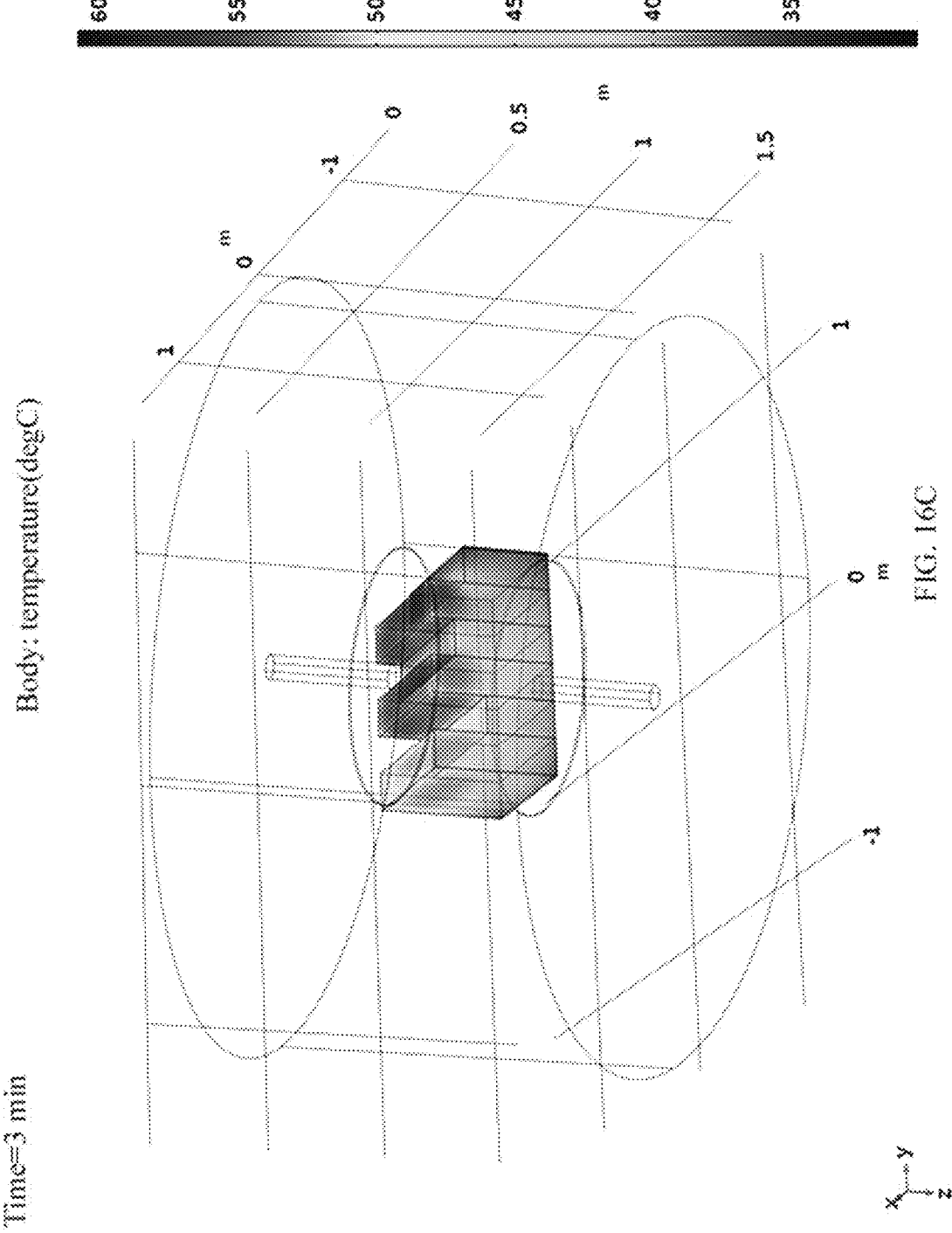
Figure 16D:
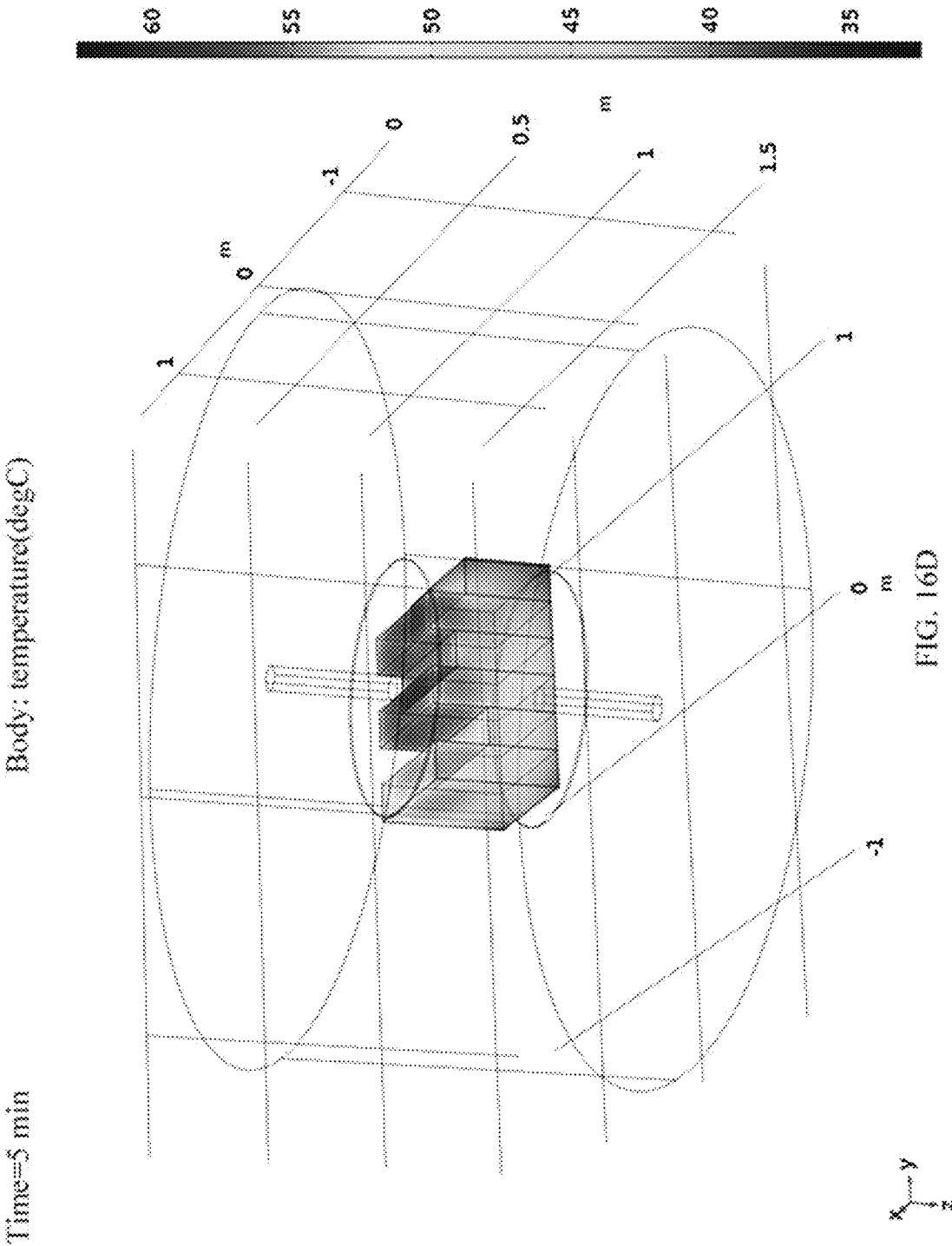

As shown in FIG. 15, the improvement involves changing from a waveguide feed form to a parallel plate form. This results in a more uniform electric field distribution, further enhancing heating uniformity.

As shown in FIGS. 16A-16D, considering the complexity of the environment and the irregularity of the heated objects, the stability of the pest control effect was verified by varying the tobacco package height from 284 mm to 500 mm. At a power of 500 W for a duration of 1 minute and a frequency of 433 MHz, a slight temperature fluctuation was observed, but it did not affect the overall temperature performance. Since the entire conveyance process of the tobacco package is about 5 minutes, reaching the required temperature within 1 minute allows for lowering the power to maintain the temperature. Internal heat conduction and convection further improve temperature uniformity, achieving real-time pest control.

Figure 17:
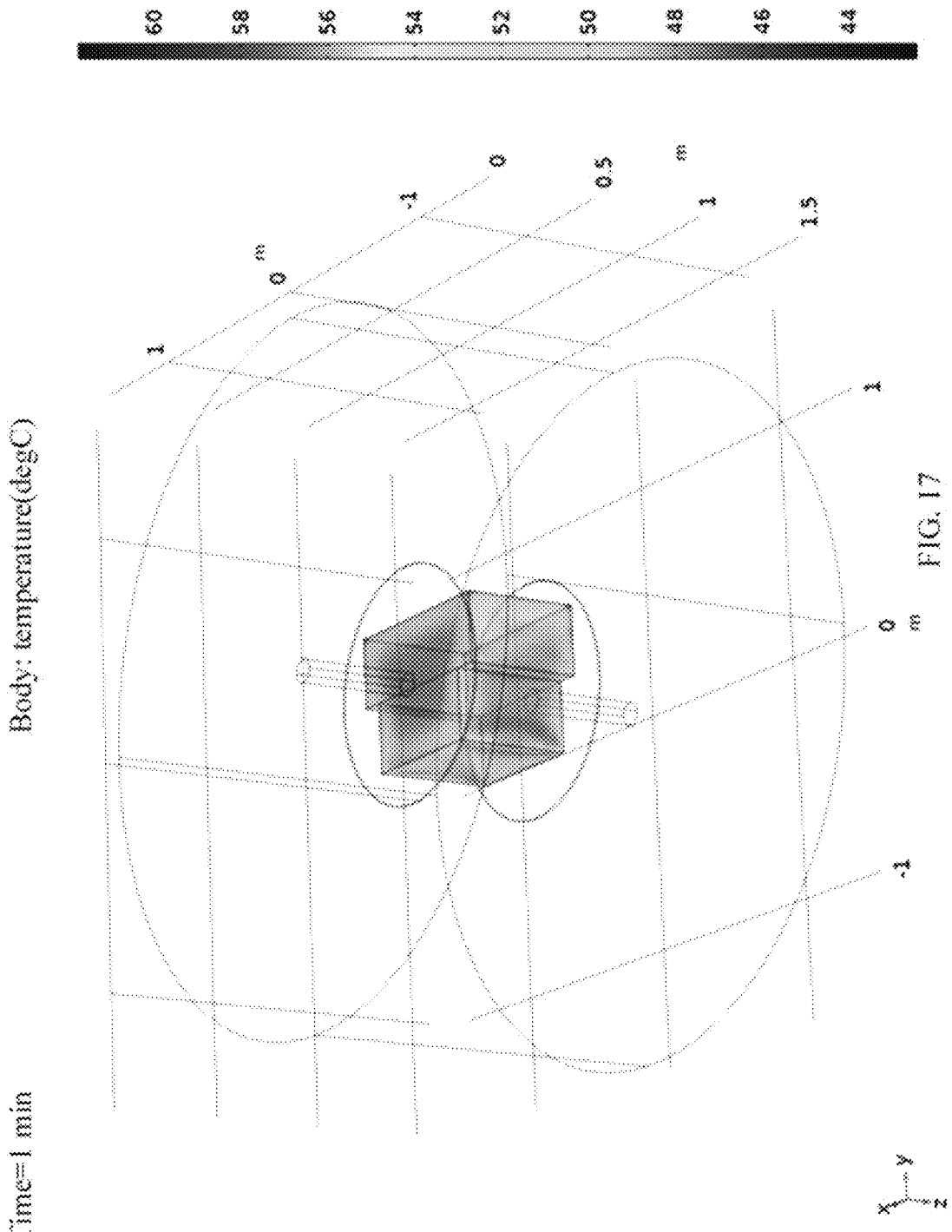
FIG. 17 is a diagram showing the impact of tobacco package length changes on the temperature of tobacco packages according to one or more embodiments of the present disclosure.

When varying the length of the tobacco pack, lengths of 1 meter and 0.7 meters were tested. The temperature of tobacco packages of both widths was found to be similar, indicating that changes in tobacco package length have minimal impact on the temperature, as shown in FIG. 17.

Calculation of Inactivation Time:

The inactivation process includes the heating phase and the pest inactivation phase. To ensure tobacco quality, the heating temperature of the tobacco package should not exceed 60° C. Therefore, understanding the inactivation time for various forms of pests at 60° C. is crucial. According to research [Lü Jianhua, Zhong Jianjun, Zhang Huina, et al. Lethal Effect of Different High Temperature Treatments on Different Development Stages of Lasioderma serricorne [J]. Research on Agricultural Catastrophology, 2014, 4(03): 15-17, 20.], placing different forms of tobacco pests in a constant temperature environment of 60° C. showed that a treatment duration of 60 seconds at 60° C. resulted in a 99% mortality rate for tobacco beetle larvae.

TABLE 3

Effects of Different Temperature Treatments on
Mortality Rates of Tobacco Beetle Larvae %

| Temperature/ | Time/s | | | | |
|---|---|---|---|---|---|
| ° C. | 60 | 75 | 90 | 105 | 120 |
| 25 | 0.00 ± 0.00 bA | 0.00 ± 0.00 cA | 0.00 ± 0.00 bA | 0.00 ± 0.00 bA | 0.00 ± 0.00 bA |
| 35 | 0.00 ± 0.00 bA | 0.00 ± 0.00 cA | 0.00 ± 0.00 bA | 0.00 ± 0.00 bA | 0.00 ± 0.00 bA |
| 45 | 0.00 ± 0.00 bA | 0.00 ± 0.00 cA | 0.00 ± 0.00 bA | 0.00 ± 0.00 bA | 0.00 ± 0.00 bA |
| 55 | 53.67 ± 3.33 bC | 85.00 ± 2.80 bB | 93.33 ± 1.67 aA | 98.33 ± 1.67 aA | 100.00 ± 0.00 aA |
| 60 | 98.33 ± 1.67 aA | 100.00 ± 0.00 aA | 100.00 ± 0.00 aA | 100.00 ± 0.00 aA | 100.00 ± 0.00 aA |
| 65 | 100.00 ± 0.00 aA | 100.00 ± 0.00 bA | 100.00 ± 0.00 aA | 100.00 ± 0.00 aA | 100.00 ± 0.00 aA |

When the treatment temperature is 65° C. for 60 seconds, the mortality rate of tobacco beetle eggs can reach 99%.

TABLE 4

Inhibitor Effects of Different Temperature
Treatments on Tobacco Bettle Eggs %

| Temperature/ | Time/s | | | | |
|---|---|---|---|---|---|
| ° C. | 60 | 75 | 90 | 105 | 120 |
| 25 | 0.00 ± 0.00 cA | 0.00 ± 0.00 cA | 0.00 ± 0.00 cA | 0.00 ± 0.00 cA | 0.00 ± 0.00 bA |
| 35 | 0.00 ± 0.00 cA | 0.00 ± 0.00 cA | 0.00 ± 0.00 cA | 0.00 ± 0.00 cA | 0.00 ± 0.00 bA |
| 45 | 0.00 ± 0.00 cA | 0.00 ± 0.00 cA | 0.00 ± 0.00 cA | 0.00 ± 0.00 cA | 0.00 ± 0.00 bA |
| 55 | 48.33 ± 4.41 bC | 58.33 ± 6.67 bC | 71.67 ± 6.01 bB | 76.67 ± 1.67 bB | 93.33 ± 1.67 aA |
| 60 | 98.33 ± 1.67 aA | 100.00 ± 0.00 aA | 100.00 ± 0.00 aA | 100.00 ± 0.00 aA | 100.00 ± 0.00 aA |
| 65 | 100.00 ± 0.00 aA | 100.00 ± 0.00 aA | 100.00 ± 0.00 aA | 100.00 ± 0.00 aA | 100.00 ± 0.00 aA |

Next, it is necessary to calculate the time required for the tobacco package to reach the desired temperature. For tobacco packages of the same size, research indicates that at a power of 6 kW, it takes 150 seconds to rise from room temperature to 60° C.

Since the inactivation time is related to the equipment length, there are two proposed schemes:

1. Inactivation at 60° C. For 75 Seconds

Expected outcome: 100% inactivation of eggs and larvae, and substantial inactivation of pupae.

Required heating time: By designing to shorten the heating phase and improving heating uniformity through the use of parallel plate capacitors, simulation optimization shows that the heating time can be reduced to 60 seconds. Thus, the total heating time required is 75+60=135 seconds (estimated length: Line A: 3.94 m; Line B: 4.73 m). If the power is further increased, the heating time can be shortened to 30 seconds, making the total heating time 75+30=105 seconds (estimated length: Line A: 3.06 m; Line B: 3.68 m).

2. Inactivation at 60° C. For 60 Seconds

Expected outcome: over 98% inactivation of eggs and larvae, with a 50% inactivation rate for pupae, inhibiting normal pupal emergence and preventing successful hatching.

Required heating time: when the heating time is 60 seconds, the total heating time required is 60+60=120 seconds (estimated length: Line A: 3.5 m; Line B: 4.2 m). If the power is further increased, the heating time can be shortened to 30 seconds, making the total heating time 60+30=90 seconds (estimated length: Line A: 2.62 m; Line B: 3.15 m).

Both methods can achieve complete inactivation of eggs and larvae and inhibit the normal emergence process of pupae, significantly reducing the annual pest growth rate.

It should be noted that the embodiments of the present disclosure can be implemented through hardware, software, or a combination of both. The hardware components can be realized using dedicated logic; the software components can be stored in memory and executed by an appropriate instruction execution system, such as a microprocessor or specially designed hardware. Those skilled in the art can understand that the aforementioned devices and methods can be implemented using computer-executable instructions and/or contained in processor control code, for example, such code is provided on carrier media such as disks, CDs, or DVD-ROMs, programmable memories such as read-only memories (firmware), or data carriers such as optical or electronic signal carriers. The devices and modules of the present disclosure can be realized by hardware circuits such as very large-scale integration or gate arrays, semiconductors such as logic chips or transistors, or programmable hardware devices such as field-programmable gate arrays or programmable logic devices. They can also be implemented by software executed by various types of processors, or by a combination of the above hardware circuits and software, such as firmware.

The above is merely a specific embodiment of the present disclosure, but the scope of protection of the disclosure is not limited to this. Any technical personnel skilled in the field can make any modifications, equivalent replacements, and improvements within the technical scope disclosed by the present disclosure, as long as they are made within the spirit and principle of the disclosure. All of these should be covered within the scope of protection of the present disclosure.

What is claimed is:

1. A control system for pest killing by microwave, wherein the control system for pest killing by microwave is a waveguide structure with two open ends and four closed sides, applied in a production line of tobacco products, the control system for pest killing by microwave comprising:

an inactivation module for raising and maintaining a temperature of a tobacco package, and for controlling the temperature to not affect a quality of the tobacco package;

an electromagnetic shielding module for preventing electromagnetic energy leakage; and a conveyor belt for transporting the tobacco package, wherein the electromagnetic shielding module comprises an input electromagnetic shielding section and an output electromagnetic shielding section, and wherein the input electromagnetic shielding section and the output electromagnetic shielding section include a plurality of waveguides of different lengths, with a height of one-quarter of a waveguide wavelength, arranged along a movement direction of the conveyor belt.

2. The control system for pest killing by microwave according to claim 1, wherein the inactivation module comprises:

a rapid temperature rise zone, wherein each area of the rapid temperature rise zone is provided with a temperature sensor, and if a rated temperature is reached in advance, a power of the area is reduced to a low power to maintain a current temperature; and an inactivation zone to maintain low microwave power input.

3. The control system for pest killing by microwave according to claim 1, wherein a quarter-length waveguide flow isolator is provided at both ends of the conveyor belt;

the tobacco package is conveyed from an input port, passing successively through the input electromagnetic shielding section, the rapid temperature rise zone, the inactivation zone, and the output electromagnetic shielding section, to an output port; and the rapid temperature rise zone and the inactivation zone contain include a microwave source, a microwave radiation device, and a control module.

4. The control system for pest killing by microwave according to claim 3, wherein the control module comprises:

a microwave power control unit for controlling a power of the microwave source by adjusting an input voltage to control an amplification factor of the microwave source;

a temperature detection unit, with a temperature sensor that is externally connected to the microwave source to ensure that a circuit temperature of the microwave source does not exceed a predetermined temperature;

a feedback unit that compares a portion of an output power obtained via a phase shifter and a coupler with the rated output power to calculate a return loss;

a cooling unit that reduces an overall circuit temperature through heat exchange on a circuit surface using airflow.

5. The control system for pest killing by microwave according to claim 1, wherein a metal parallel plate capacitor electrode plate is symmetrically placed on a top, bottom, left, and right of the inactivation module, with the top plate positioned at a top of a cavity and the bottom plate arranged below the conveyor belt, forming a pull-out type structure in the enclosed cavity below the conveyor belt; and wherein the metal parallel plate capacitor electrode plates on the top and bottom are connected to the microwave source in a multi-section parallel form.

6. The control system for pest killing by microwave according to claim 1, wherein a plurality of waveguide ports are arranged directly above the inactivation module, each waveguide port connected to a microwave source to feed the microwave energy into the cavity, with different energy feeding forms for the plurality of waveguide ports; and wherein the metal below the conveyor belt is of a mesh structure, with a metal area below the mesh structure arranged as a pull-out type structure.

7. The control system for pest killing by microwave according to claim 1, wherein a metal parallel plate capacitor electrode plate is symmetrically placed on the top, bottom, left, and right of the inactivation module, with two electrode plates connected to the microwave source, coupling energy into the waveguide formed in the inactivation module through electromagnetic coupling; and wherein the metal below the conveyor belt is of a mesh structure, with a metal area below the mesh structure arranged as a pull-out type structure.

8. A control method for pest killing by microwave based on the control system for pest killing by microwave according to claim 1, wherein the control method for pest killing by microwave comprises the following steps:

transporting, by the conveyor belt, the tobacco package from the input port, sequentially passing through the input electromagnetic shielding section, a heating section, and the output electromagnetic shielding section, to the output port;

controlling, by the control module, an electromagnetic wave frequency and power output, and continuously monitoring an electromagnetic wave output;

radiating, by the microwave radiation device, electromagnetic wave onto the tobacco package in the rapid temperature rise zone, wherein the tobacco package absorbs the electromagnetic wave and heats up, the temperature detection unit, upon detecting that the temperature has reached the rated temperature, provides feedback to an information interaction unit, and subsequently transporting the tobacco package to the inactivation zone;

maintaining the rated temperature of the tobacco package in the inactivation zone, where all developmental stages of the tobacco beetle are killed, and then transporting the tobacco package out of the inactivation zone.

9. A computer device, comprising a memory and a processor, wherein the memory stores a computer program which, when executed by the processor, causes the processor to perform the control method for pest killing by microwave according to claim 8.

10. A computer-readable storage medium, storing a computer program which, when executed by a processor, causes the processor to perform the control method for pest killing by microwave according to claim 8.

* * * * *